United States Patent
Guo et al.

(10) Patent No.: US 11,671,839 B2
(45) Date of Patent: Jun. 6, 2023

(54) SPECTRUM MANAGEMENT DEVICE AND METHOD, WIRELESS NETWORK MANAGEMENT DEVICE AND METHOD, AND MEDIUM

(71) Applicant: Sony Group Corporation, Tokyo (JP)

(72) Inventors: Xin Guo, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/884,583

(22) Filed: Aug. 10, 2022

(65) Prior Publication Data

US 2022/0386131 A1    Dec. 1, 2022

Related U.S. Application Data

(63) Continuation of application No. 16/962,235, filed as application No. PCT/CN2019/086939 on May 15, 2019.

(51) Int. Cl.
| | | |
|---|---|---|
| *H04W 16/10* | (2009.01) | |
| *H04W 16/14* | (2009.01) | |
| *H04W 72/04* | (2023.01) | |

(52) U.S. Cl.
CPC ........... *H04W 16/10* (2013.01); *H04W 16/14* (2013.01); *H04W 72/04* (2013.01)

(58) Field of Classification Search
CPC ...... H04W 16/10; H04W 16/14; H04W 72/04
See application file for complete search history.

(56) References Cited

U.S. PATENT DOCUMENTS

| | | |
|---|---|---|
| 2014/0192825 A1 | 7/2014 | Wang et al. |
| 2017/0006475 A1 | 1/2017 | Liu |
| 2018/0084431 A1 | 3/2018 | Ueng et al. |
| 2019/0364435 A1 | 11/2019 | Ahmavaara |
| 2020/0351899 A1 | 11/2020 | Sun et al. |
| 2021/0176132 A9 | 6/2021 | Sevindik |

FOREIGN PATENT DOCUMENTS

| | | |
|---|---|---|
| CN | 101083825 A | 12/2007 |
| CN | 102186176 A | 9/2011 |
| CN | 104735677 A | 6/2015 |
| CN | 104796901 A | 7/2015 |
| JP | 2010521105 A | 6/2010 |
| JP | 2013530608 A | 7/2013 |
| JP | 2015505228 A | 2/2015 |
| WO | WO-2013061586 A | 5/2013 |

OTHER PUBLICATIONS

International Search Report and Written Opinion dated Aug. 6, 2019 for PCT/CN2019/086939 filed on May 15, 2019, 8 pages.

*Primary Examiner* — Umair Ahsan
(74) *Attorney, Agent, or Firm* — Xsensus LLP

(57) ABSTRACT

The present invention relates to a spectrum management device and method, a wireless network management device and method, and a medium. According to one embodiment, an electronic device for spectrum management comprises a processing circuit. The processing circuit is configured to perform control in order to send spectrum supply and demand information to one or more first spectrum management nodes and/or receive the spectrum supply and demand information from the one or more first spectrum management nodes. The spectrum supply and demand information is associated with spectrum supply and demand of the electronic device and/or of a wireless network management node managed by the first spectrum management node.

9 Claims, 19 Drawing Sheets

SPECTRUM MANAGEMENT DEVICE AND METHOD, WIRELESS NETWORK MANAGEMENT DEVICE AND METHOD, AND MEDIUM

CROSS-REFERENCE TO RELATED APPLICATIONS

The present application is a continuation of U.S. application Ser. No. 16/962,235, filed Jul. 15, 2020, which is based on PCT filing PCT/CN2019/086939, filed May 15, 2019, which claims priority to CN 201810494820.9, filed May 22, 2018, the entire contents of each are incorporated herein by reference.

FIELD

The present disclosure generally relates to the field of wireless communications, and in particular to an electronic device for spectrum management, a spectrum management method, a wireless network management device, a wireless network management method and a computer readable medium.

BACKGROUND

With the rapid growth in the number of wireless devices and diversities of wireless services, a spectrum scarcity problem is becoming increasingly serious. A promising solution is to perform spectrum sharing. With this solution, a target frequency band may be shared among multiple systems through coexistence coordination, thereby improving resource utilization efficiency. At present, a frequency band opened for sharing is referred to as an unlicensed frequency band, which may be of 3.5 GHz, 5 GHz, 6 GHz, or the like.

SUMMARY

In a current shared spectrum allocation system, a central control method is used, that is, a central server is used to dynamically acquire an interference protection condition of an incumbent user, for example and collect information of subsystems at various stages, to allocate resources for the subsystems on the premise of satisfying the interference protection condition of the incumbent user. However, the central control method has disadvantages in the following aspects of robustness, fairness, complexity, economy and expansibility. For the robustness, once a management node is damaged or lost, an operation of an entire system may be affected. For the fairness, since allocation is performed centralized, it is difficult to realize fairness actually. For the complexity, since a computing capacity is realized centralized, it is difficult to ensure performance of a large-scale network. For the economy, since costs for operation and maintenance are high, spectrum utilization costs are increased, which is unfavourable for the scale of share spectrum service. For the expansibility, the share spectrum service requires a complex application and approval process, which is unfavourable for the diversity of service requirements.

The present disclosure is provided to solve at least a part of the above problems. A distributed shared spectrum management scheme is provided according to the present disclosure. A distributed shared spectrum management system may include a spectrum management node and a wireless network management node. The spectrum management node is configured to manage the spectrum and the distributed system. The wireless network management node is configured to acquire the spectrum from the spectrum management node and serve a user equipment managed by the wireless network management node. Multiple spectrum management nodes operate cooperatively to ensure fairness and effectiveness of a spectrum allocation operation.

In the following, an overview of the embodiments of the present disclosure is given simply to provide basic understanding to some aspects of the present disclosure. It should be understood that this overview is not an exhaustive overview of the present disclosure. It is neither intended to determine a critical part or an important part of the present disclosure, nor to limit the scope of the present disclosure. An object of the overview is only to give some concepts in a simplified manner, which serves as a preface of a more detailed description described later.

According to an embodiment, an electronic device for spectrum management is provided. The electronic device for spectrum management includes processing circuitry. The processing circuitry is configured to perform control to transmit to and/or receive from at least one first spectrum management node, spectrum supply and demand information. The spectrum supply and demand information is related to spectrum supply and demand of a wireless network management node managed by the electronic device and/or the first spectrum management node.

According to another embodiment, a spectrum management method is provided. The spectrum management method includes: transmitting to and/or receiving from at least one first spectrum management node, spectrum supply and demand information, by a second spectrum management node. The spectrum supply and demand information is related to spectrum supply and demand of a wireless network management node managed by the second spectrum management node and/or the first spectrum management node.

According to another embodiment, a wireless network management device is provided. The wireless network management device includes processing circuitry. The processing circuitry is configured to: perform control to transmit spectrum supply and demand information to a spectrum management node; and perform control to receive information indicating a spectrum allocation manner from the spectrum management node. The spectrum allocation manner is determined based at least in part on the spectrum supply and demand information.

According to another embodiment, a wireless network management method is provided. The wireless network management method includes: transmitting spectrum supply and demand information to a spectrum management node; and receiving information indicating a spectrum allocation manner from the spectrum management node. The spectrum allocation manner is determined based at least in part on the spectrum supply and demand information.

A computer readable medium is further provided according to an embodiment of the present disclosure. The computer readable medium includes executable instructions that, when executed by an information processing apparatus, cause the information processing apparatus to execute the method according to the embodiments of the present disclosure.

With the embodiments of the present disclosure, a spectrum allocation operation can be performed fairly and efficiently.

BRIEF DESCRIPTION OF THE DRAWINGS

The present disclosure may be understood better with reference to the description given in conjunction with drawings hereinafter. The same or similar reference numerals are used to indicate the same or similar components throughout the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Figure 1:
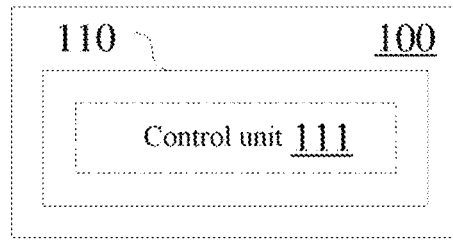
FIG. 1 is a block diagram showing a configuration example of an electronic device for spectrum management according to an embodiment of the present disclosure.

The embodiments of the present disclosure will be explained with reference to the drawings hereinafter. Elements and features described in one drawing or one embodiment of the present disclosure may be combined with elements and features described in one or more other drawings or embodiments. It is to be noted that, for the purpose of clarity, in the drawings and the descriptions, representations and descriptions of elements and processes that are irrelevant to the present disclosure and are known to those skilled in the art are not provided.

As shown in FIG. 1, an electronic device 100 for spectrum management according to an embodiment includes processing circuitry 110. The processing circuitry 110 may be implemented by a chip, a chipset, a central processing unit (CPU) or the like.

The processing circuitry 110 includes a control unit 111. It is to be noted that, although the control unit 111 and other units are shown as functional blocks in the drawing, it is to be understood that functions of the units may be implemented by the processing circuitry as a whole, and are not necessarily implemented by discrete actual components in the processing circuitry. In addition, although the processing circuitry is shown by one block, the electronic device may include multiple processing circuitries. The functions of the control unit 111 and other units may be distributed onto the multiple processing circuitries, and thus the multiple processing circuitries cooperate to perform the functions.

The electronic device 100 according to the embodiment may operate as a spectrum management node.

Specifically, the electronic device 100 according to an embodiment may be applied to a citizens broadband radio service (CBRS) at the 3.5 GHz frequency band. The electronic device 100 may be configured at a spectrum access system (SAS) side or a co-existence manager (CxM) side. The wireless network management device managed by the electronic device 100 may include a citizens broadband radio service device CBSD.

The electronic device 100 according to another embodiment may be applied to a 5 GHz broadband system. The electronic device 100 may be configured at a C3 instance side. The wireless network management device managed by the electronic device 100 may include a wireless access system (WAS) or a radio local area network (RLAN).

Although the present disclosure is described by taking 3.5 GHz and 5 GHz as examples, the present disclosure is not limited thereto. The present disclosure may also be applicable to other unlicensed frequency bands. In addition, in the embodiment of the present disclosure, the unlicensed spectrum is utilized satisfying a utilization requirement on the unlicensed spectrum, for example, protection of an incumbent user at the frequency band or protection of a user having a high priority.

In addition, it is to be noted that, the electronic device according to the embodiment of the present disclosure may be implemented by part of a spectrum management node (for example, the SAS or the CxM). Alternatively, the electronic device may be implemented independently of a spectrum management node.

The control unit 111 is configured to perform control to transmit to and/or receive from at least one spectrum management node (except a spectrum management node corresponding to the electronic device 100), spectrum supply and demand information. The spectrum supply and demand information is related to spectrum supply and demand of a wireless network management node (WNM) managed by the electronic device 100 and/or the at least one spectrum management node.

The spectrum supply and demand information may include at least one of spectrum remising information and spectrum demand information.

Specifically, the spectrum remising information includes spectrum information and remising node information, for example. The spectrum information is used to perform spectrum allocation calculation for satisfying a spectrum usage constraint, which includes, for example, at least one of a spectrum type, a spectrum range, an available time range, a usage type, an available position range and remising node position information. The remising node information is used to calculate a spectrum transaction and generate spectrum allocation manner information (in the following embodiments, the spectrum allocation manner information is also referred to as a spectrum block), which includes, for example, at least one of a timestamp of publishing remising information, a remising node address (or ID) and a charging standard. A remised spectrum may be an unoccupied spectrum or an occupied spectrum. In a case that the remised spectrum is an unoccupied spectrum, the remising node may be a spectrum management node (SM). In a case that the remised spectrum is an occupied spectrum, the remising node may be a WNM.

The spectrum demand information includes, for example, spectrum information and demand node information. The spectrum information is used to perform the spectrum allocation calculation for satisfying the spectrum usage constraint, which includes, for example, a spectrum type, a spectrum range, an available time range, a usage type, and demand node position information. The demand node information is used to calculate a spectrum transaction protocol and generate spectrum allocation manner information (or a spectrum block), which includes, for example, at least one of a timestamp of publishing demand information, a demander address and a charging standard. The demand node may be the WNM.

According to the embodiment, spectrum supply and demand information is transmitted and received between spectrum management nodes, such that the spectrum management nodes can operate cooperatively to realize spectrum allocation.

In addition, according to an embodiment, the spectrum allocation manner may be determined further based on the spectrum supply and demand information.

Figure 2:
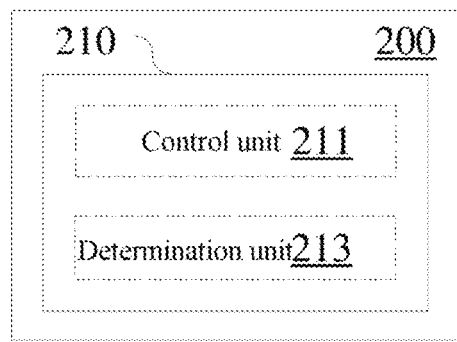
FIG. 2 is a block diagram showing a configuration example of an electronic device for spectrum management according to another embodiment.

As shown in FIG. 2, an electronic device 200 for spectrum management according to an embodiment includes processing circuitry 210. The processing circuitry 210 includes a control unit 211 and a determination unit 213. Some of functions of the control unit 211 are similar to that of the control unit 111 described above.

The determination unit 213 is configured to determine, based on the spectrum supply and demand information, a spectrum allocation manner with respect to the wireless network management node managed by the electronic device 200 and/or a spectrum management node (except a spectrum management node corresponding to the electronic device 200).

In addition, the control unit 211 is further configured to perform control to transmit information indicating the spectrum allocation manner determined by the determination unit 213 to the spectrum management node except the spectrum management node corresponding to the electronic device 200.

In other words, the electronic device 200 according to the embodiment is used to determine a spectrum allocation manner (which may be referred to as "mining" in some embodiments, that is, generating a spectrum block) and transmit information on the spectrum allocation manner (which may be referred to as a spectrum block in some embodiments).

Specifically, the generating a spectrum block (mining) refers to that a spectrum management node generates new spectrum allocation information for a spectrum remising node/spectrum demand node based on spectrum supply and demand relation in information shared by the spectrum management nodes (which may be referred to as a spectrum bulletin board in some embodiments) and spectrum usage status of the wireless network management node. In addition to the spectrum supply and demand, the allocation result is also required to satisfy the spectrum usage constraint condition. In some embodiments, the spectrum management node for generating a spectrum block may also be referred to as a miner node or a super node.

Figure 13:
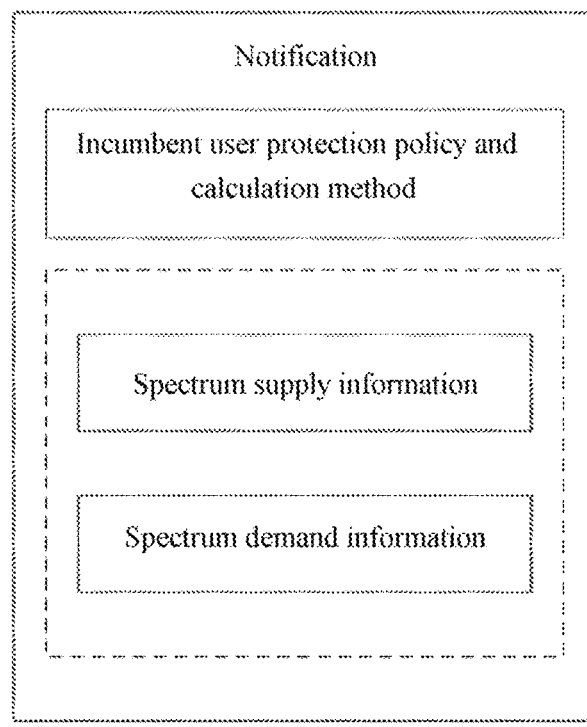
FIG. 13 shows an example of a spectrum bulletin board.

As an example, FIG. 13 schematically shows information included in the spectrum bulletin board. One type of the information is spectrum usage constraint information, which includes requirements (which may be characterized by a reference point and an aggregate interference upper limit) on protection of an incumbent user or protection of a secondary user having a high priority and a calculation method. Status information of the incumbent user may be acquired from a legal incumbent information source that is allowed by a system and may dynamically change over time. In addition, examples of spectrum supply information and spectrum demand information are described above, which are not repeated herein.

Figure 14:
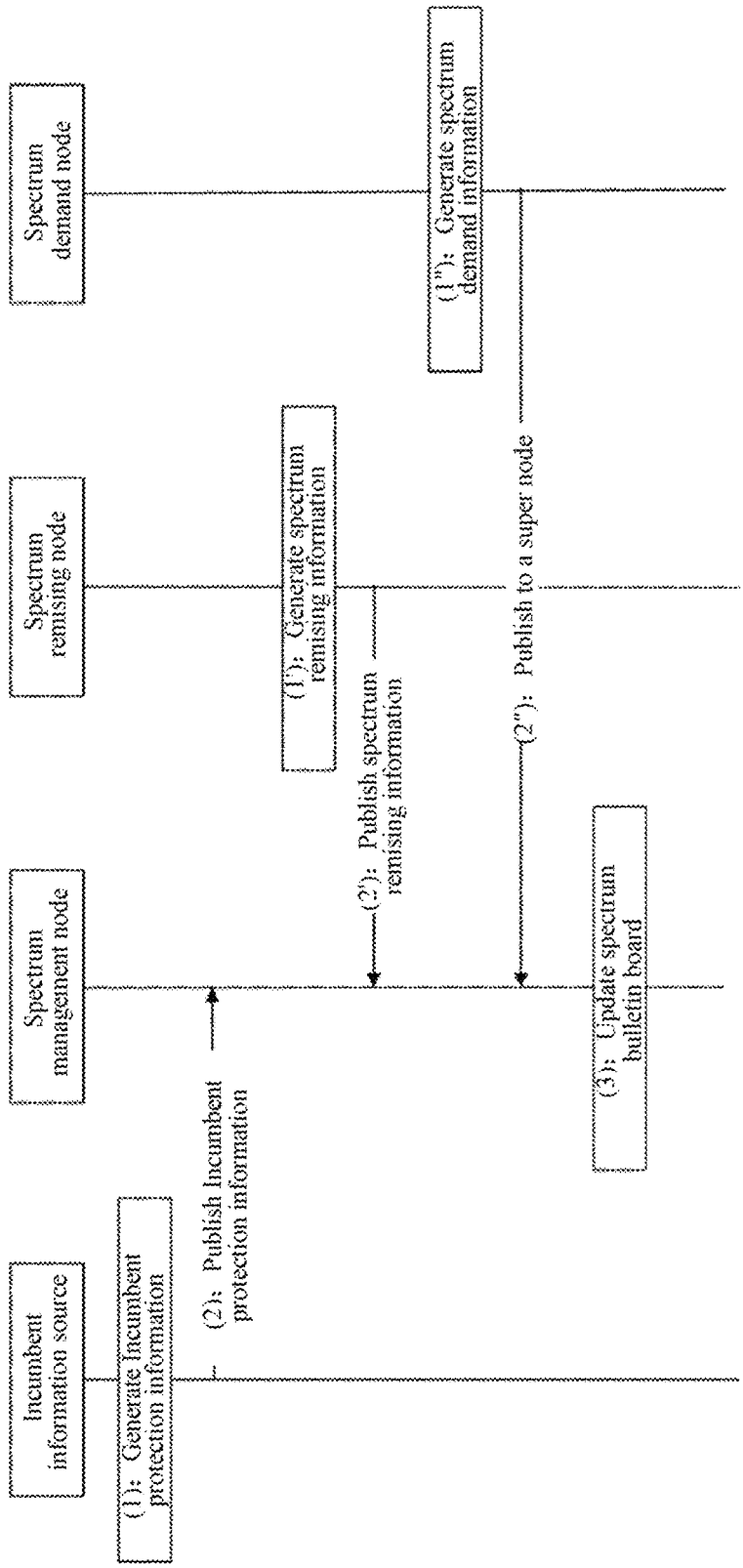
FIG. 14 shows an example of a process of updating the spectrum bulletin board.

As an example, FIG. 14 shows an example of a process of maintaining the spectrum bulletin board.

An incumbent information source in FIG. 14 generates incumbent protection information and publishes the incumbent protection information to a spectrum management node.

In addition, a spectrum remising node generates spectrum remising information (1'), and the spectrum remising node publishes the spectrum remising information to the spectrum management node (2'). A spectrum demand node generates spectrum demand information (1"), and the spectrum demand node publishes the spectrum demand information to the spectrum management node (2").

After receiving the information, the spectrum management node updates the spectrum bulletin board (3) and sets a time instant at which the spectrum bulletin board is updated as an update timestamp $T_{update}$. In this way, nodes in the entire network may acquire the information.

Figure 15:
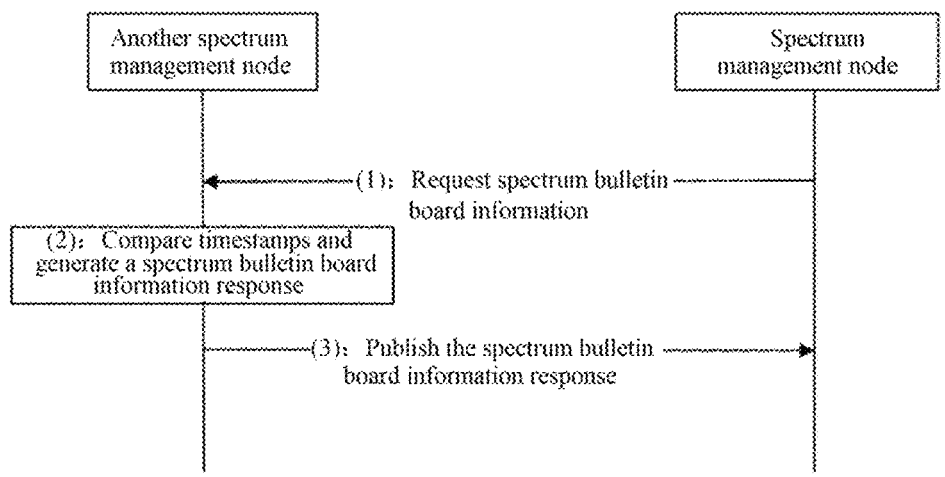
FIG. 15 shows an example of a process of information interaction between spectrum management nodes.

FIG. 15 shows an example of a process of information interaction between spectrum management nodes.

As shown in FIG. 15, a spectrum management node (for example, a miner node) requests spectrum bulletin board information from another spectrum management node (1). The request may include the timestamp of updating the information last time. The other spectrum management node generates a response by comparing a timestamp $T_{req}$ in the request with the update timestamp $T_{update}$ in the spectrum bulletin board (2). In a case that $T_{req}$ is greater than or equal to $T_{update}$, the response indicates that it is unnecessary to perform update. In a case that $T_{req}$ is less than $T_{update}$, bulletin board information after $T_{req}$ is used to generate a response. The other spectrum management node publishes the spectrum bulletin board information response to the miner node. A process that the miner node requests spectrum blockchain information from another spectrum management node is similar to that described above, which is not repeated herein.

The Embodiment of the electronic device (for example, the miner node described above) for determining the spectrum allocation manner is described above. In addition, the embodiments of the present disclosure further include an electronic device for acquiring the spectrum allocation manner from another spectrum management node rather than determining the spectrum allocation manner.

Figure 3:
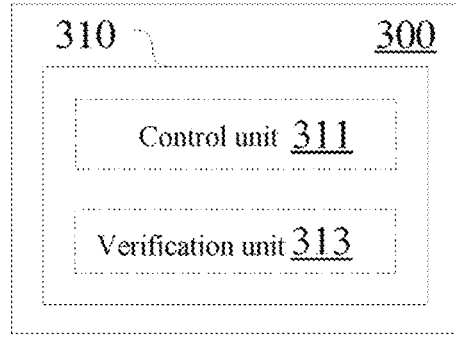
FIG. 3 is a block diagram showing a configuration example of an electronic device for spectrum management according to another embodiment.

As shown in FIG. 3, an electronic device 300 for spectrum management according to an embodiment includes processing circuitry 310. The processing circuitry 310 includes a control unit 311 and a verification unit 313.

Some of functions of the control unit 311 are similar to that of the control unit 111 described above.

In addition, the control unit 311 is further configured to perform control to receive information on a spectrum allocation manner determined by a spectrum management node (except a spectrum management node corresponding to the electronic device 300) with respect to a wireless network management node managed by the electronic device 300 and/or another spectrum management node.

The verification unit 313 is configured to verify the spectrum allocation manner indicated by the received information.

Specifically, the verification unit 313 may verify the spectrum allocation manner according to the following conditions: ensuring spectrum usage of a specific user equipment or causing interference on the specific user equipment to be within a predetermined range; and spectrum allocation satisfying spectrum supply and demand of the wireless network management node.

The verifying the spectrum allocation manner may include: performing spectrum usage constraint condition calculation on spectrum allocation information; determining whether the spectrum satisfies the spectrum usage constraint condition defined by the spectrum bulletin board when being used simultaneously by a wireless network management node corresponding to an output address and another wireless network management node satisfying the usage condition in the available time range.

In addition, according to an embodiment, the electronic device 300 (which is similar to the electronic device 200 described above) may also be configured to determine the spectrum allocation manner. The control unit 311 may further be configured to perform control to store information on a spectrum allocation manner determined by the electronic device 300 or information on the verified spectrum allocation manner determined by another spectrum management node.

As an example, the information on the spectrum allocation manner may be stored in a form of blockchain. Next, the blockchain is briefly explained.

The blockchain, as a new technology, is gradually developed with the increasing popularity of digital cryptocurrencies such as bitcoin, which provides a decentralized credit establishment paradigm without trust accumulation. At present, the blockchain has attracted great attentions and widespread concerns of financial industries, scientific research institutions, government departments and investment corporations. The blockchain technology records all past transaction records and historical data by establishing a database that is maintained jointly and cannot be tampered. All data is stored in a distributed manner and is opened and transparent. With the technology, any internet users that do not know each other may reach a credit agreement in a manner such as a contract, a point to point accounting, a digital encryption and the like without any central trust agencies. With the technology, digital currencies, digital assets, intellectual property, smart contracts and the like may be established.

The blockchain has features such as decentration, reliable database, open source programmable, collective maintaining, safe and credible and transaction quasi anonymity, which provides a good foundation for implementing a robust, fair, simple, economical and extensible management system. However, there is a key difference between a present application scenario of the blockchain and an application scenario of the shared spectrum. Since the blockchain is mainly applied to scenarios such as finance currency and copyright maintenance, the blockchain has a feature of asset uniqueness or object uniqueness. Compliance of a transaction is verified simply. For example, for a transfer transaction of virtual currencies, it is only required to confirm that a capital outflow party has an ownership of the virtual currencies and has enough virtual currencies to afford the transfer transaction. In addition to ensuring the transaction to be non-tamperable and traceable, an important problem in designing the blockchain is to avoid double-spending of a same currency.

There are multiple ways to classify the blockchain. In one classification method, the blockchain application is classified into a blockchain 1.0, a blockchain 2.0 and a blockchain 3.0 based on application ranges and developmental stages of the blockchain. The blockchain 1.0 supports a virtual currency application, that is, a cryptographic currency application related to transfer accounts, remittance and digital payments. The bitcoin is a typical application of the blockchain 1.0. The blockchain 2.0 supports a smart contract application, where contracts are cornerstones of the blockchain applications in the economy, the market and the finance. Applications of the blockchain 2.0 include stocks, bonds, futures, loans, mortgages, property rights, intelligent property and smart contracts. The application of the blockchain 3.0 is decentralized, which is beyond the range of the currency, the finance and the market and especially includes applications in fields of governments, health, science, culture and art.

In another classification method, the blockchain is classified into a public blockchain, a consortium blockchain and a private blockchain based on a blockchain deployment mode. The public blockchain is a network architecture mode in which there is no owner of the network and the network is fully open to the outside. Each node in the network may selectively have a same privilege. In the completely decentralized blockchain network, all nodes may read and write blockchain data and may serve as a candidate node of accounting to participate in an agreeable process and have a chance to participate in generating a ledger and accounting. The consortium blockchain is a network architecture mode in which the network is shared by a consortium and is open to consortium members. Each node in the network is endowed with a different privilege. In the partially decentralized blockchain network, based on the endowed privilege, a node reads and writes the blockchain data, participates in an agreeable process, and participates in generating a ledger and accounting. The private blockchain is a network architecture mode in which the network belongs to one owner and is open to members of the owner. Each node in the network is endowed with a different privilege. In the partially centralized blockchain network, based on the endowed privilege a node reads and writes the blockchain data, participates in an agreeable process, and participates in generating a ledger and accounting.

Figure 9:
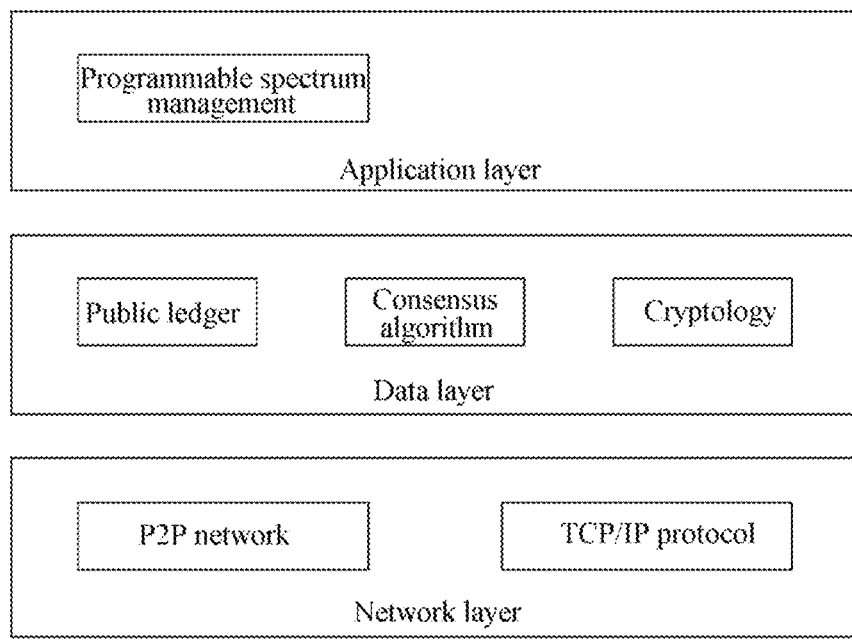
FIG. 9 shows an example of a distributed spectrum management protocol stack.

An embodiment according to the present disclosure is based on a blockchain system, and built on network communications on the basis of the IP communication protocol and a distributed network, which exchanges messages completely through the Internet. FIG. 9 is a schematic diagram showing a protocol stack of distributed spectrum management system based on the blockchain 1.0. It is to be noted that the protocol stack is merely exemplary and the embodiments of the present disclosure may be applied to any version of blockchain.

Figure 10:
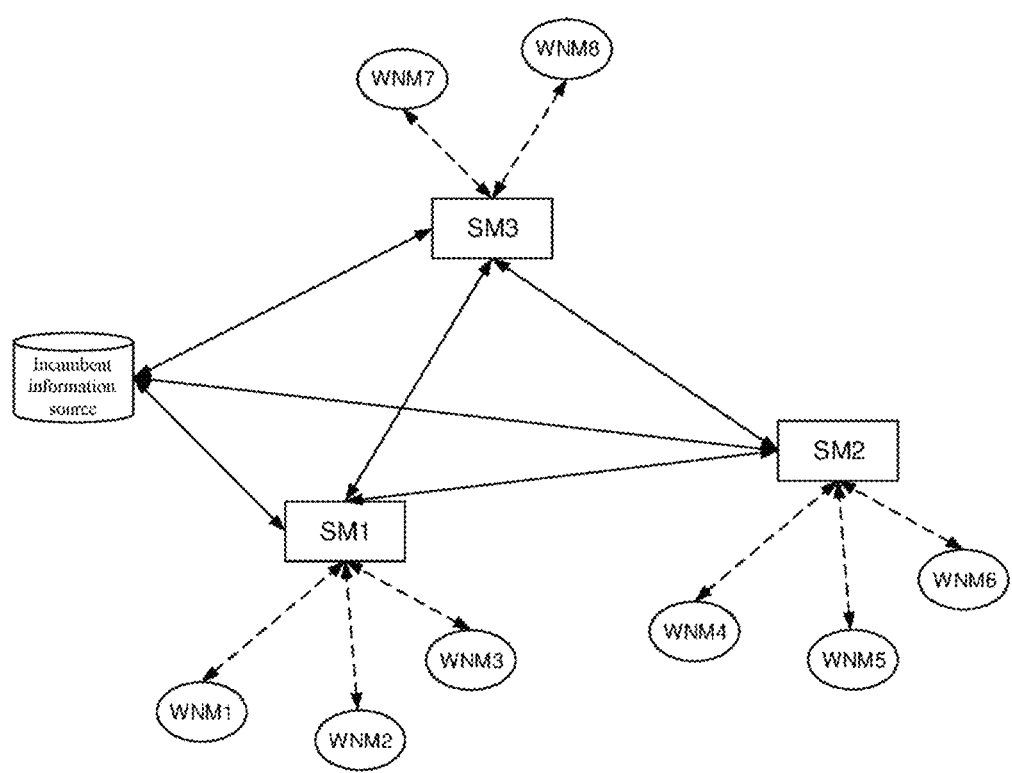
FIG. 10 shows an example of a structure of a distributed spectrum management system.

FIG. 10 shows a structure of a distributed spectrum management system to which the embodiments of the present disclosure may be applied. A logical entity includes an incumbent information source, spectrum management nodes and wireless network management nodes.

Specifically, the incumbent information source provides the spectrum management nodes with incumbent user status. The spectrum management node encapsulates spectrum allocation information by a block. The block for encapsulating is referred to as a spectrum block. The spectrum blocks are linked by using the blockchain as an underlying protocol, to form a spectrum blockchain or a spectrum ledger. The spectrum ledger is jointly maintained by multiple spectrum management nodes in the network. The wireless network management node is an access point to the wireless network. For example, the wireless network management node may be an eNB, a WiFi-AP or a CBSD. The wireless network management node acquires the spectrum from the spectrum management node and serves the managed user equipment. The wireless network management node may be a spectrum remising node or a spectrum demand node, which is determined based on a spectrum supply and demand operation.

The structure shown in FIG. 10 may be a public blockchain structure, a consortium blockchain structure or a private blockchain structure, this is determined based on which kind of spectrum management node belongs to the structure. In a case that the spectrum management nodes may be open to the public, the structure is the public blockchain structure. In a case that the spectrum management node is a consortium member, the structure is the consortium blockchain structure. In a case that the spectrum management node is owned by an organization, the structure is the private blockchain structure. Considering safe protection of the incumbent user, the consortium blockchain or the private blockchain is suitable for deployment. That is, the spectrum management node is owned by a consortium or an organization and the incumbent information source establishes an interface only with the spectrum management node.

Figure 11:
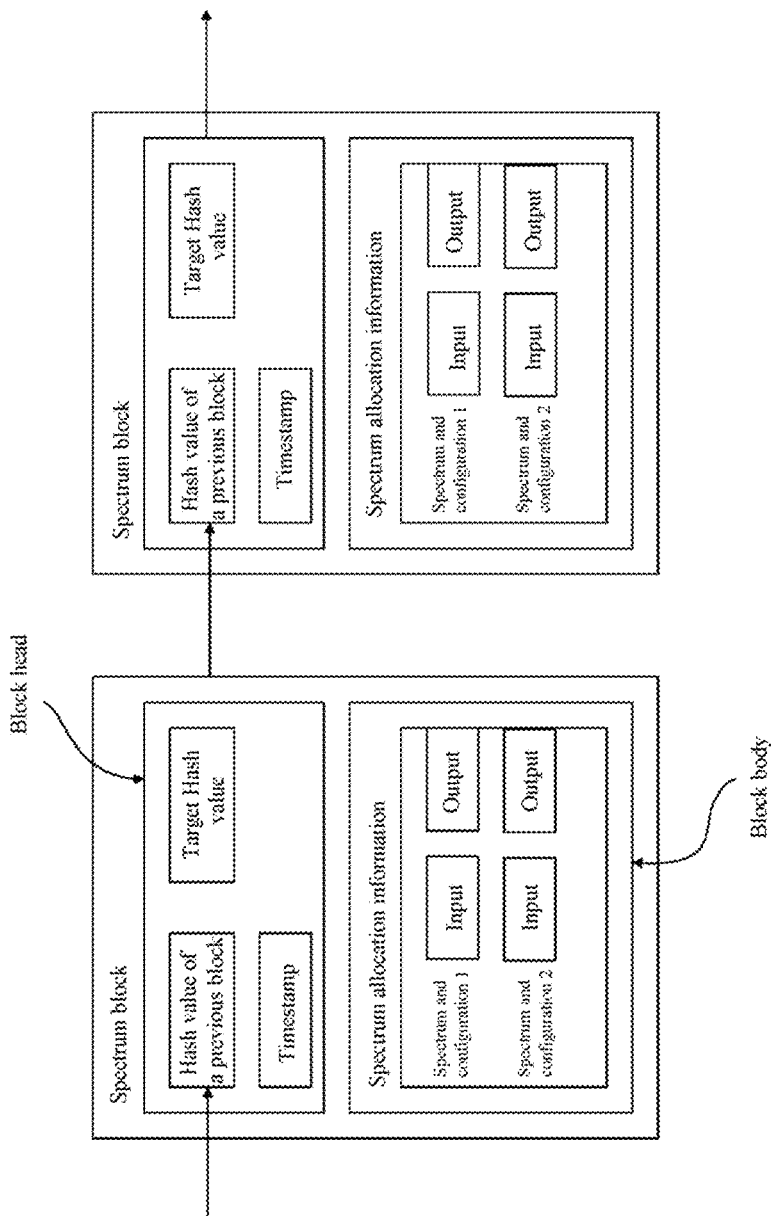
FIG. 11 shows an example of a structure of a spectrum ledger.

Data information used in the embodiment of the present disclosure may include a spectrum ledger and a spectrum bulletin board. An example of the spectrum bulletin board is described above, which is not repeated herein. An exemplary structure of the spectrum ledger is as shown in FIG. 11. The spectrum ledger is formed by linking spectrum blocks. A link pointer is a block head Hash value generated by processing a block head using the cryptographic Hash algorithm. A spectrum block includes a block head and a block body. A first block in the entire ledger is referred to as a genesis block.

Figure 12:
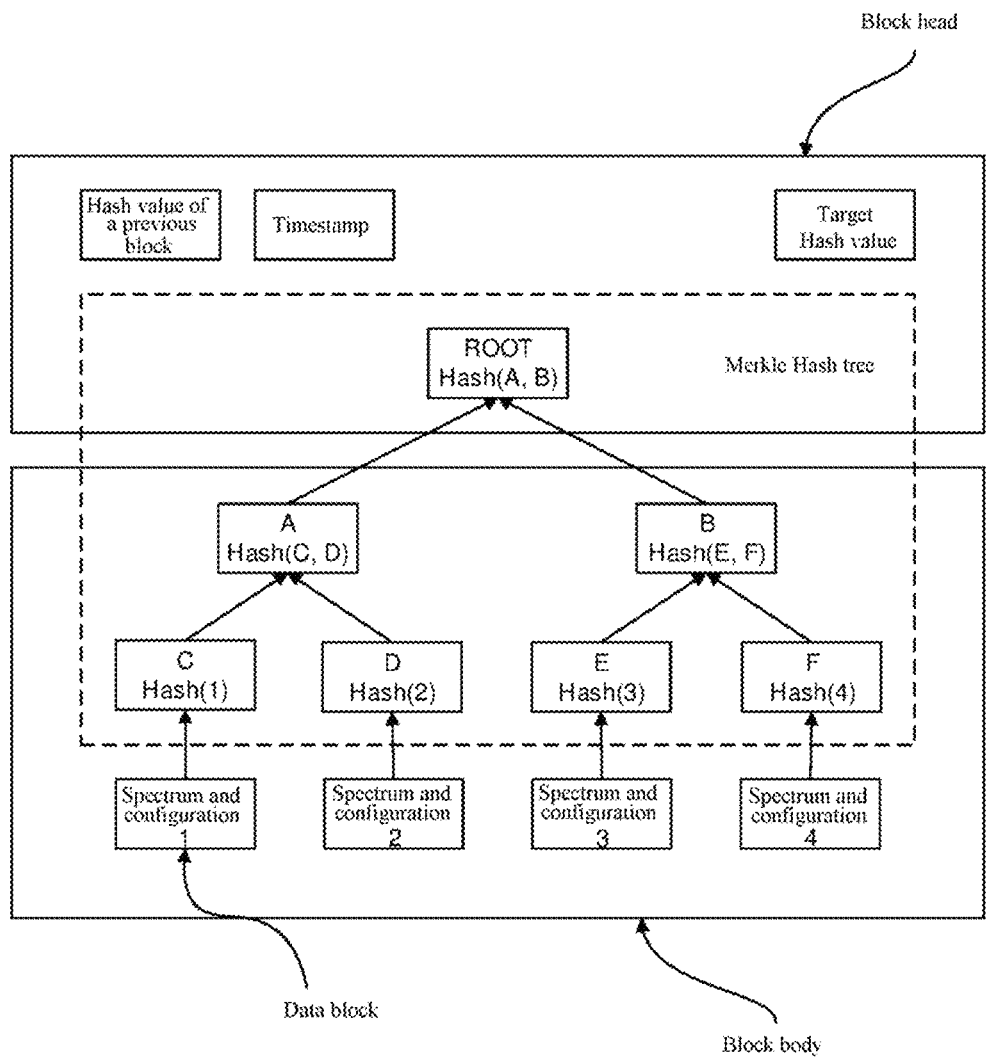
FIG. 12 shows an example of a structure of a spectrum block.

A block head includes a Hash value of the entire block, which is used to link blocks and simplify verification. A structure of a block body mainly includes basic data blocks. In addition, in order to ensure that data information in each block cannot be tampered with, the basic data may be processed by using a tree information structure including the Hash algorithm. Referring to FIG. 12, an exemplary Merkle Hash tree is a binary tree or a multiple tree based on Hash values. A value on each leaf node of the Merkle Hash tree is a Hash value of a data block. A value on the non-leaf node is a Hash value of a combination result of all child nodes of the non-leaf node. A ROOT of the entire tree is stored in the block head and is used to quickly verify whether data information in each block is tampered with. Other nodes of the tree are stored in the block body.

Different from the common blockchain, the block body includes information related to spectrum allocation, which includes, for example, spectrum and configuration (which include a spectrum range, a maximum available power and an available time range), an input representing a spectrum remising node and an output representing a spectrum demand node. Based on a blockchain protection privacy model, an input and an output are respectively an address and position information of a spectrum remising node/spectrum demand node. The address is represented by a public key of the node.

Figure 16:
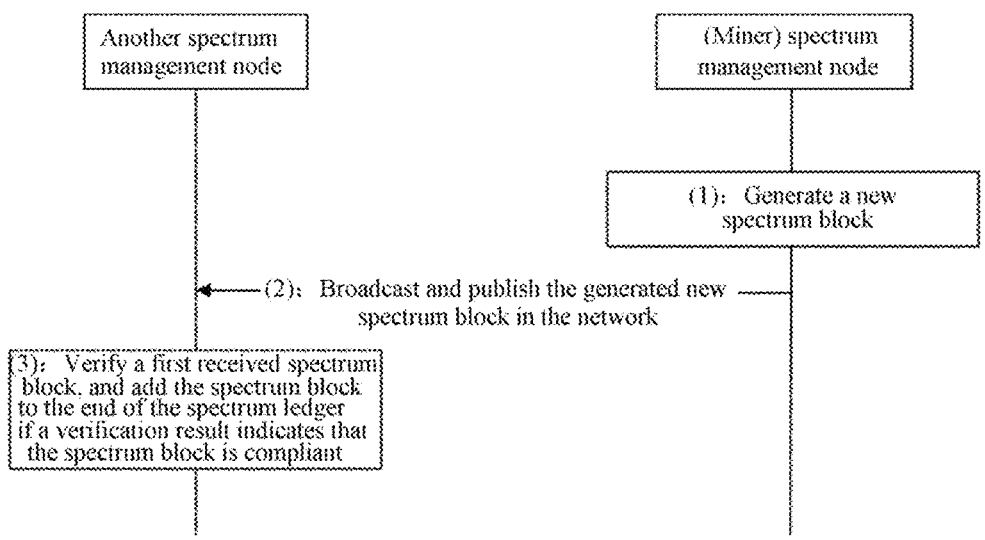
FIG. 16 shows an example of a process of generating a spectrum block (mining)

FIG. 16 shows an example of a process of generating a spectrum block (mining).

As shown in FIG. 16, a miner node generates, by using the calculation method in the spectrum bulletin board, new spectrum allocation information for the spectrum remising node/demand node based on the spectrum supply and demand relation in the spectrum bulletin board and spectrum usage status of another wireless network management node in the spectrum ledger. The allocation result is required to satisfy the spectrum usage constraint condition in the spectrum bulletin board. In a case of calculating a spectrum allocation result satisfying the constraint, the miner node encapsulates the spectrum allocation result as a spectrum block (1).

Next, the miner node broadcasts the spectrum block to a network including the spectrum management nodes (2).

Then, another spectrum management node receives the broadcasted spectrum block and verifies a first received spectrum block (3). If a verification result indicates that the first received spectrum block is compliant, the other spectrum management node adds the spectrum block to the end of the spectrum ledger.

For storage of spectrum ledger data, the spectrum management node may further be classified into a full node and a lightweight node based on an amount of stored data. The full node may store spectrum block information including spectrum usage status of all current wireless network nodes (for example, the spectrum block information may include data of all spectrum blockchains from the genesis block), and has advantages that a spectrum block generation or a spectrum block data verification operation may be performed only based on a spectrum blockchain and a spectrum bulletin board that are stored locally. The lightweight node may only store a part of spectrum block information. When other data is required, the lightweight node may request the required data from another spectrum management node to perform a corresponding operation.

With continuing reference to FIG. 3, according to an embodiment, the verification unit 313 may be configured to, in a case where multiple pieces of new spectrum allocation manner information are received within a specific period of time, select one having the earliest publication time therefrom to perform the verification.

For the embodiment of the storage performed in the form of blockchain, in a case where multiple pieces of new spectrum allocation manner information having the same block serial number are received, the verification unit 313 may select one having the earliest publication time therefrom to perform the verification.

In addition, according to an embodiment, the control unit 311 may be configured to, in a case where a time window identifier of received new spectrum allocation manner information is not continuous with a time window identifier of currently stored spectrum allocation manner information, perform control to send a request for performing information synchronization to another spectrum management node.

For the embodiment of the storage performed in the form of blockchain, the control unit 311 may be configured to, in a case where a block serial number of received new spectrum allocation manner information is not continuous with a serial number of a currently stored blockchain, perform control to send a request for performing information synchronization to another spectrum management node.

In addition, according to an embodiment, the control unit 311 may be configured to, in a case where a predetermined number of pieces of spectrum allocation manner information are newly stored, perform control to notify a spectrum allocation manner indicated by spectrum allocation manner information preceding the predetermined number of pieces of spectrum allocation manner information to the wireless network management node managed by the electronic device 300.

For the embodiment of the storage performed in the form of blockchain, the control unit 311 may be configured to, in a case where a predetermined number of blocks are newly stored, perform control to notify a spectrum allocation manner indicated by a block preceding the predetermined number of blocks to the wireless network management node managed by the electronic device 300.

Figure 17:
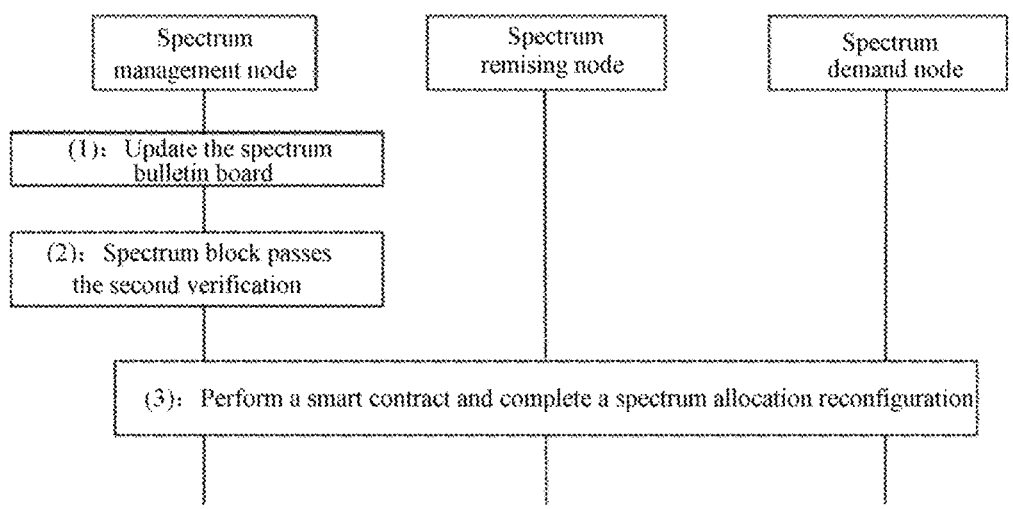
FIG. 17 shows an example of a process of performing spectrum allocation.

As an example, FIG. 17 shows a process of performing spectrum allocation based on a smart contract. As shown in FIG. 17, a spectrum management node updates content in the spectrum bulletin board (1). Specially, when a spectrum block is added to the end of the spectrum ledger, the spectrum management node may clear a spectrum remising/demand node and a resource supply and demand request on the bulletin board to avoid a repeated resource allocation subsequently.

Next, all spectrum management nodes perform a second verification of a spectrum block (2). The second verification may be regarded as a validity verification. Specifically, there may be a case that two miner nodes in different areas simultaneously "mining" two new blocks and the two new blocks are linked with each other. In this case, a furcation may occur on a main chain. Instead of immediately determining which block is not logical, the system appoints that subsequent miners always select a blockchain having a maximum accumulated proof of work (alternatively, other manners such as proof of stake may be used). Therefore, after the furcation occurs on the main chain, a miner of a subsequent block links the block with a candidate chain having a maximum current accumulated proof of work through calculation and comparison, to form a longer new main chain, and automatically abandons a short chain at a position of the furcation, to solve the problem of furcation. According to the above embodiment, proof of work may depend on the number of spectrum supply and demand nodes satisfying requirements in the spectrum block. A large number indicates a heavy workload. In a case that after the spectrum block, X blocks are subsequently added to the spectrum ledger, it is determined that the spectrum block passes the second verification. For example, X may be 5.

Then, a spectrum remising node and a spectrum demand node relevant to the spectrum allocation performs a spectrum allocation reconfiguration (3). Spectrum allocation information in the spectrum block on the blockchain actually is a smart contract. The contract stipulates a condition for a relevant node to remise or use the spectrum. The relevant node performs a corresponding configuration based on information of the contract.

Figure 18:
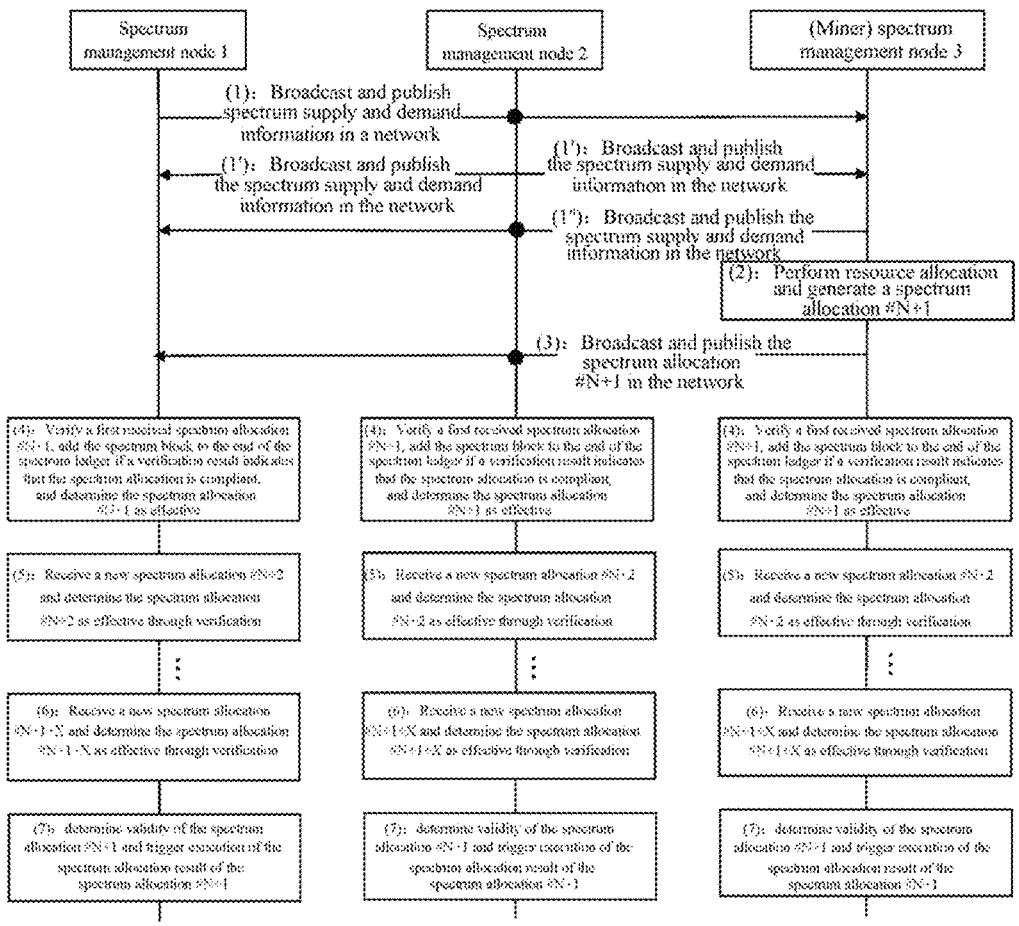
FIG. 18 to FIG. 20 each shows an example of a process of distributed spectrum allocation.

FIG. 18 shows an example of a process of performing distributed spectrum allocation.

In processes (1), (1'), (1"), each spectrum management node broadcasts and publishes local spectrum supply and demand information in a network including the spectrum management node, such that each spectrum management node acquires same global spectrum supply and demand information.

In process (2), a miner node generates new spectrum allocation information for a spectrum remising node/demand node based on the spectrum supply and demand relation on the spectrum bulletin board and the spectrum usage status of other wireless network management nodes on the spectrum ledger. The allocation result is required to satisfy the spectrum usage constraint condition on the spectrum bulletin board. Given that a current maximum serial number of the spectrum allocation on the spectrum ledger is represented by #N. In a case of calculating a spectrum allocation result satisfying the constraint condition, the miner node encapsulates the result as a spectrum allocation #N+1.

In process (3), the miner node broadcasts and publishes the spectrum allocation #N+1 in the network including the spectrum management node.

In process (4), a spectrum management node that receives the spectrum allocation #N+1 performs the following steps (a) to (c).

In step (a), the spectrum allocation #N+1 is selected. In a case that there are multiple spectrum allocations #N+1, a spectrum allocation #N+1 having an earliest timestamp is selected.

In step (b), the first verification is performed on the selected spectrum allocation #N+1. The first verification may be regarded as compliance verification. The first verification may be performed on effectiveness of the spectrum allocation and consistency between the spectrum allocation #N+1 and the spectrum ledger. The effectiveness of the spectrum allocation refers to that whether a spectrum allocation result satisfies the spectrum usage constraint condition on the spectrum bulletin board. The consistency between the spectrum allocation #N+1 and the spectrum ledger refers to that whether an index of a last spectrum allocation stored on the spectrum allocation #N+1 is consistent with an index of the spectrum allocation #N+1 and that whether a generated spectrum allocation encapsulation satisfies the requirements.

In step (c), if a verification result indicates that the spectrum allocation #N+1 is compliant, the spectrum block is added to the end of the spectrum ledger and the spectrum block is determined as an effective spectrum allocation #N+1.

In a case that the spectrum management node is a miner node and the spectrum allocation #N+1 is selected, the above step of the first verification may be skipped and the process directly proceeds to step (c).

In process (5), similarly to process (4), a spectrum management node that receives a spectrum allocation #N+2 performs the first verification on the spectrum allocation #N+2 and determines that the spectrum allocation #N+2 is effective.

In process (6), similar to process (5), the spectrum management node successively perform the first verification on the received spectrum allocations until it is determined that a spectrum allocation #N+1+X is effective, where X is a positive integer greater than or equal to 1.

In process (7), the spectrum allocation #N+1 passes the second verification, which triggers execution of the spectrum allocation result of the spectrum allocation #N+1. Generally, in a case that X new spectrum allocations are added to the spectrum ledger subsequently, it is determined that the spectrum block passes the second verification.

Figure 19:
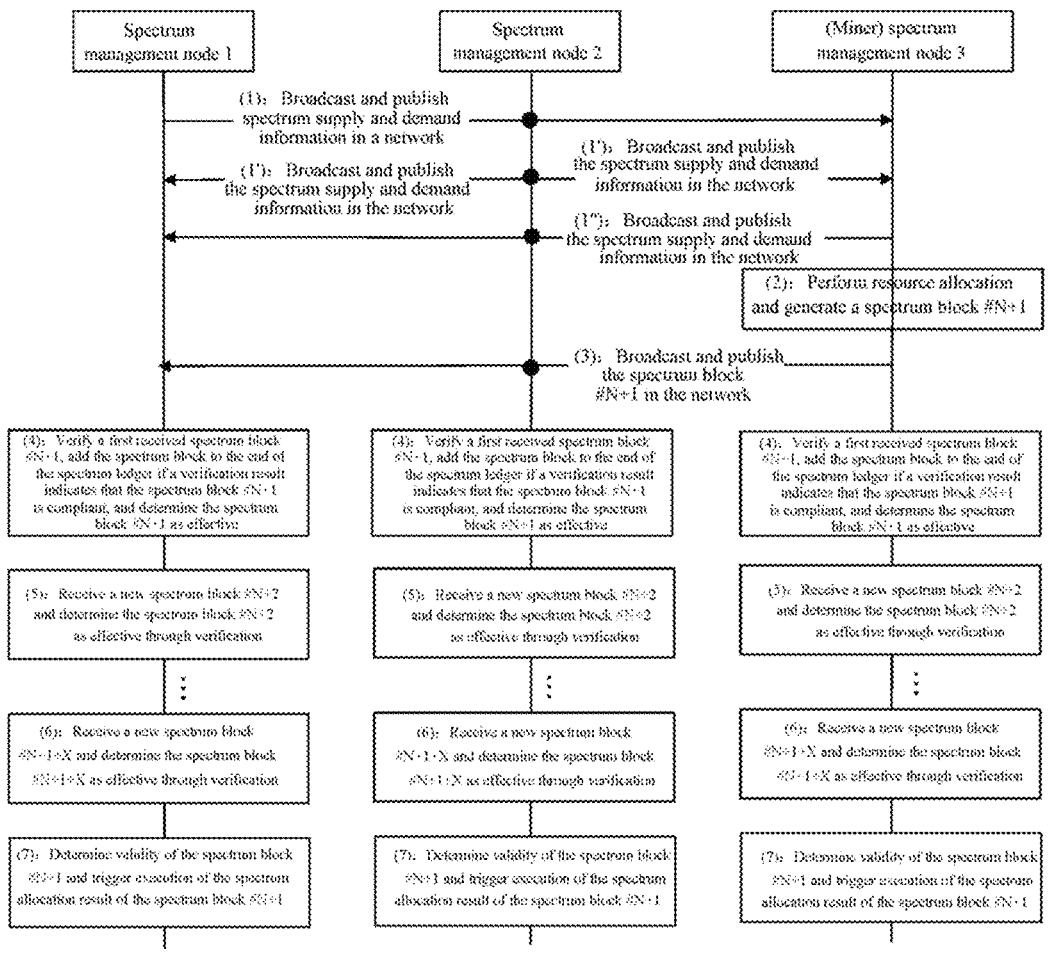

FIG. 19 shows an example of a process of performing the distributed spectrum allocation. The process shown in FIG. 19 is the same as the process shown in FIG. 18 except that a spectrum allocation in FIG. 19 is encapsulated in a form of a spectrum block. Detailed descriptions related thereto are omitted herein.

Figure 20:
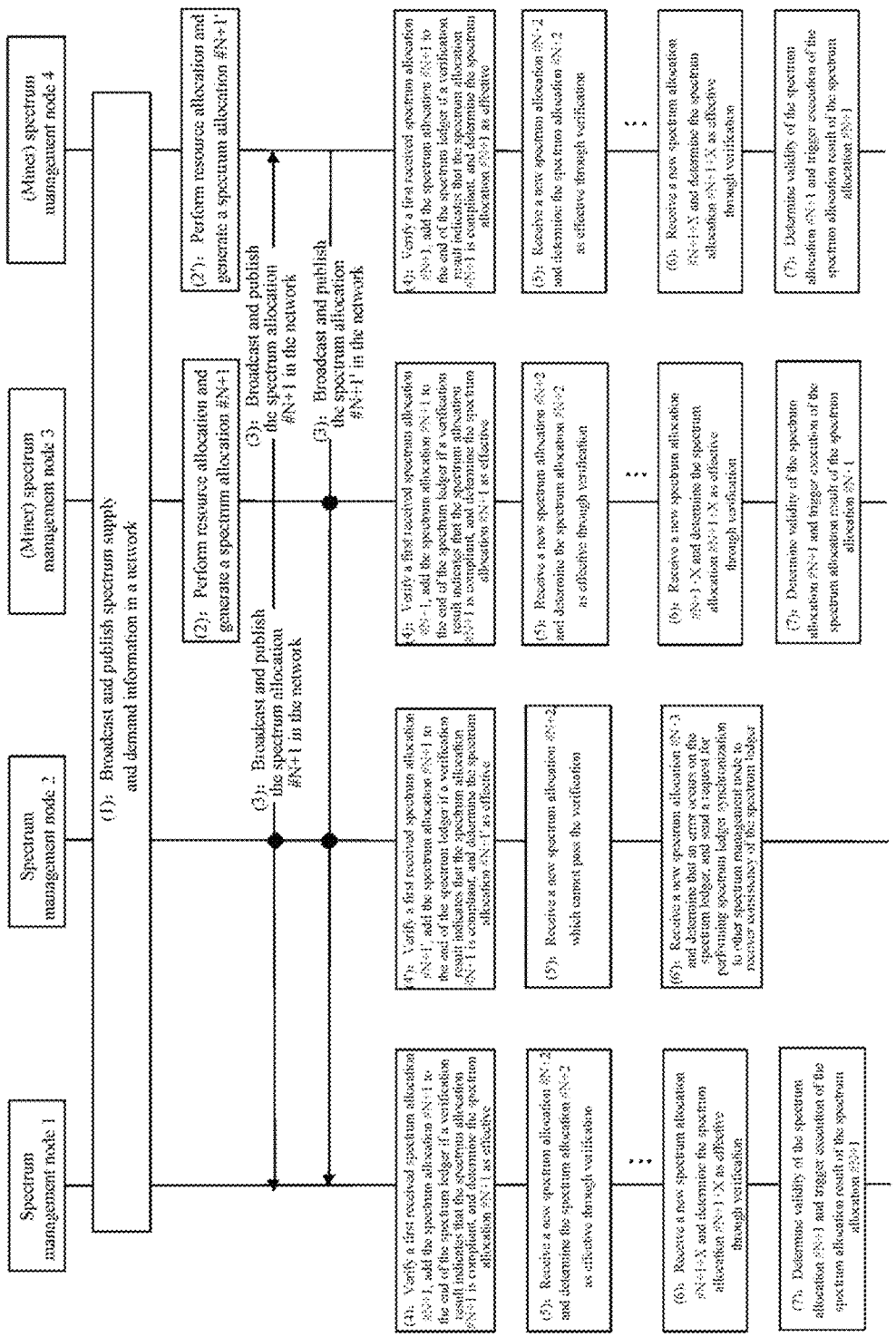

FIG. 20 shows an example of a process of performing the distributed spectrum allocation and furcation processing.

As shown in FIG. 20, in process (1), each spectrum management node acquires the same global spectrum supply and demand information through broadcasting.

In processes (2) and (2'), a miner node 3 and a miner node 4 respectively generate a spectrum allocation #N+1 and a spectrum allocation #N+1'.

In processes (3) and (3'), the miner node 3 and the miner node 4 respectively broadcast and publish the generated spectrum allocations.

In processes (4) and (4'), a spectrum management node that receives the spectrum allocation #N+1 and/or the spectrum allocation #N+1' performs the first verification. Different spectrum allocations may be selected due to some reasons, such as transmission delay or transmission failure. In a case of the transmission failure or the transmission delay, #N+1 and #N+1' cannot arrive at the spectrum management nodes in the same order, or not both of the #N+1 and the #N+1' can arrive at the spectrum management nodes. As a result, an effective spectrum allocation #N+1' determined by a spectrum management node 2 is different from an effective spectrum allocation #N+1 determined by another spectrum management node.

In processes (5) to (7), in addition to the spectrum management node 2, the other spectrum management node normally maintains the spectrum ledger following the process shown in FIG. 18.

In process (5'), the spectrum management node 2 receives a new spectrum allocation #N+2, which cannot pass the verification, this is because that the spectrum allocation #N+1 is preceding the spectrum allocation #N+2, index verification cannot pass. Therefore, the spectrum management node 2 has to discard the spectrum allocation #N+2.

In process (6'), when receiving a new spectrum allocation #N+3, the spectrum management node 2 detects that a serial number of the spectrum allocation #N+3 is not continuous with that of the last spectrum allocation #N+1' on the spectrum ledger, thereby determining that an error occurs on the spectrum ledger. Therefore, the spectrum management node 2 sends a request for performing spectrum ledger synchronization to other spectrum management node to recover consistency of the spectrum ledger.

In a case that a spectrum allocation is encapsulated in a form of a spectrum block, a process of performing the distributed spectrum allocation and furcation processing is similar to the process in FIG. 20 except that the spectrum allocation is in a form of the spectrum block. Detailed descriptions related thereto are omitted herein.

As described above, the embodiments of the present disclosure may be applied to the Citizens Broadband Radio Service at the 3.5 GHz frequency band or the 5 GHz broadband system. Next, the two application examples will be further described.

First Example: The CBRS at the 3.5 GHz Frequency Band

The spectrum access system (SAS) developed by the WINNF organization researches coexistence management between multiple systems at the 3.5 GHz frequency band. In the United States, the 3.5 GHz frequency band has been used for a Department of Defense (DoD) radar system. At present, the federal communications commission (FCC) is discussing putting the 3.5 GHz frequency band into commercial use in a spectrum sharing manner. The shared system is part of the SAS, which includes three levels.

An incumbent user represents a highest level, which includes the above DoD radar system, a fixed satellite service (FSS) and grandfathered terrestrial wireless operations in limited time.

Other levels are collectively referred to as citizens broadband radio service device (CBSD). The CBRS further includes two levels, which are a priority access license (PAL) and a general authorized access (GAA).

Figure 21:
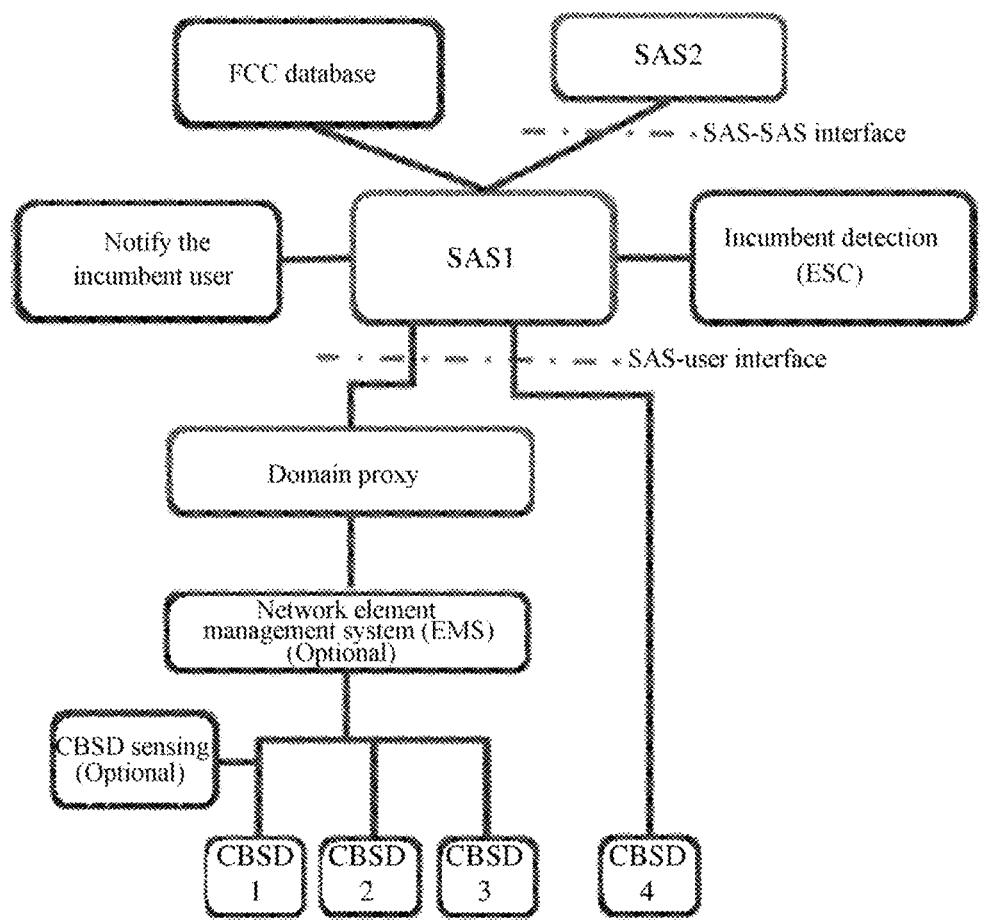
FIG. 21 shows an example of a structure of a logical entity for resource management.

In spectrum usage, it is required to protect the incumbent user from harmful interference of the CBSD and protect the PAL from harmful interference of the GAA. The CBRS performs resource allocation in a unit of census tract. The PAL may use spectrums ranging from 3550 MHz to 3650 MHz, which are licensed in units of 10 MHz for a period of 3 years. Total spectrums occupied by all PALs in each census tract do not exceed 70 MHz and a spectrum occupied by each PAL does not exceed 40 MHz. The GAA may use spectrums ranging from 3550 MHz to 3700 MHz under a premise of promising not to produce harmful interference to a high level user. A logical entity for resource management mainly includes the SAS and a domain proxy. Referring to FIG. 21, on behalf of an individual CBSD or a network CBSD, the domain proxy interacts with the SAS to acquire a service for the CDSD. However, the CBSD may directly interact with the SAS to acquire the service without the domain proxy.

Figure 22:
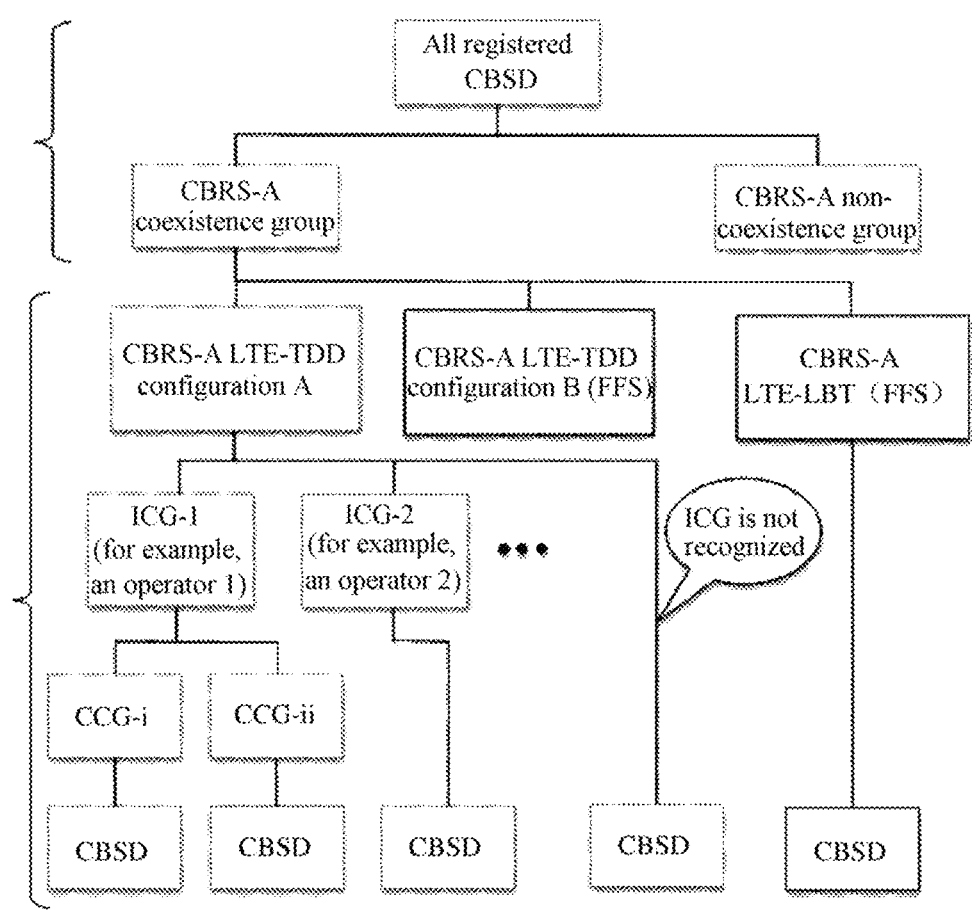
FIG. 22 shows coexistence of different citizens broadband radio service devices (CBSDs)

The CBRS alliance (CBRS-A) organization develops a technical specification (TS) to provide coexistence between different CBSDs. A logical entity coexistence manager in a coexistence group (GxG) managed by the CBRS-A is used to manage coexistence between GAA users according to the rule of the SAS, reference may be made to FIG. 22.

In a case that the embodiments of the present disclosure are applied to the CBRS at the 3.5 GHz frequency band, the incumbent information source may be an incumbent detection (ECS). A spectrum allocation device SM may be the SAS or the CxM. The wireless network management device WNM may be the CBSD. The user equipment UE may be a terminal user device (EUD).

Second Example: The 5 GHz Broadband System

An object of the European Commission is to develop a technology for the 5G broadband system. Research results include a project of a broadband radio access network (BRAN): WAS/RLAN operates cooperatively at the central of the 5 GHz frequency band.

A logical entity for management in the 5 GHz broadband system is referred to as a central controller and coordinator (C3). A reified physical entity is referred to as a C3 instance. The C3 instance may include multiple distributed interconnected C3 instances, which perform central coordination on managed objects through information interaction.

The managed object in the 5 GHz broadband system is referred to as WAS/RLAN.

In a case that the embodiments of the present disclosure are applied to the 5 GHz broadband system, the incumbent information source may be an incumbent information source defined by the system. The spectrum allocation device SM may be the C3 instance. The wireless network management device WNM may be the WAS/RLANs. The user equipment UE may be a subscriber of the WAS/RLANs.

In the above description of the embodiments of devices, it is apparent that some processes and methods are also disclosed. Next, the spectrum management method according to the embodiment will be explained without repeating details described above.

Figure 4:
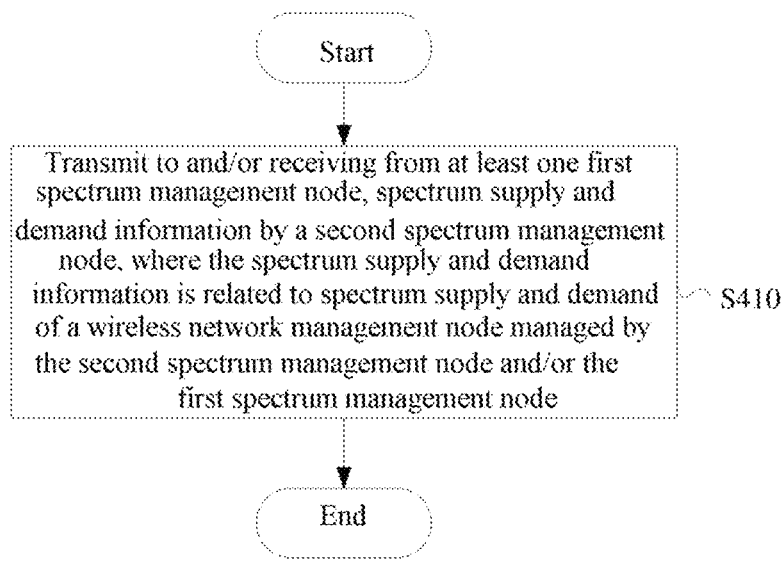
FIG. 4 is a flowchart showing a process example of a spectrum management method according to an embodiment of the present disclosure.

As shown in FIG. 4, a spectrum management method according to an embodiment includes step S410. In step S410, a second spectrum management node transmits to and/or receives from at least one first spectrum management node, spectrum supply and demand information. The spectrum supply and demand information is related to spectrum supply and demand of a wireless network management node managed by the second spectrum management node and/or the first spectrum management node.

Figure 5:
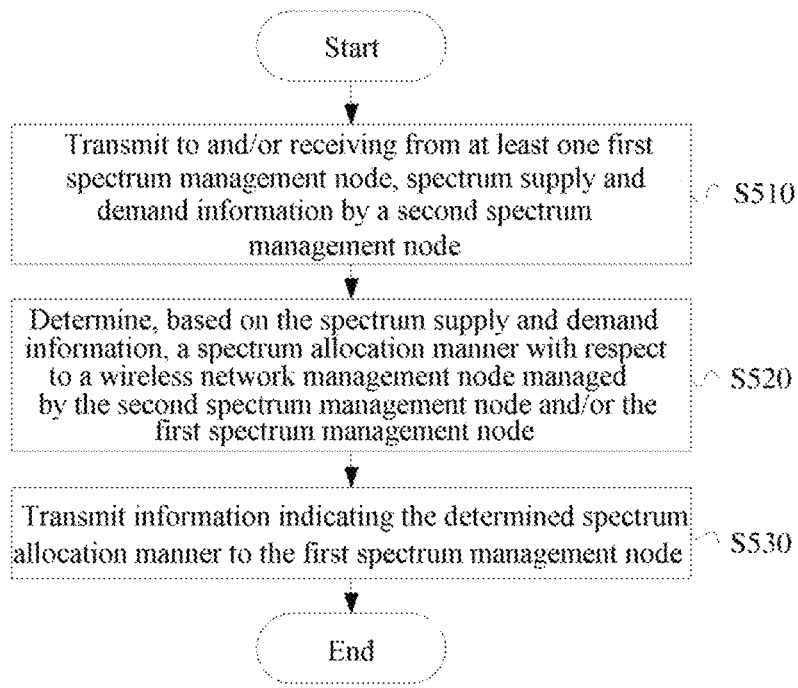
FIG. 5 is a flowchart showing a process example of a spectrum management method according to another embodiment.

As shown in FIG. 5, in addition to step S510 which is similar to step S410, a spectrum management method according to an embodiment further includes steps S520 and S530.

In step S520, a spectrum allocation manner with respect to the wireless network management node managed by the second spectrum management node and/or the first spectrum management node is determined based on the spectrum supply and demand information.

In step S530, information indicating the determined spectrum allocation manner is transmitted to the first spectrum management node.

Figure 6:
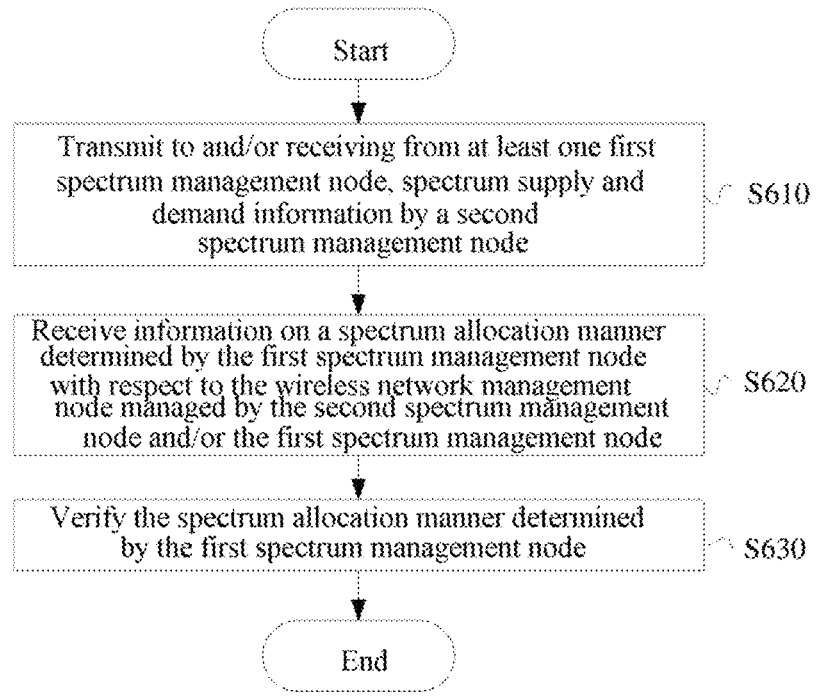
FIG. 6 is a flowchart showing a process example of a spectrum management method according to another embodiment.

As shown in FIG. 6, in addition to step S610 which is similar to step S410, a spectrum management method according to an embodiment further includes steps S620 and S630.

In step S620, information on a spectrum allocation manner determined by the first spectrum management node with respect to the wireless network management node managed by the second spectrum management node and/or the first spectrum management node is received.

In step S630, the spectrum allocation manner determined by the first spectrum management node is verified.

In addition, a wireless network management device is further provided according to an embodiment of the present disclosure.

Figure 7:
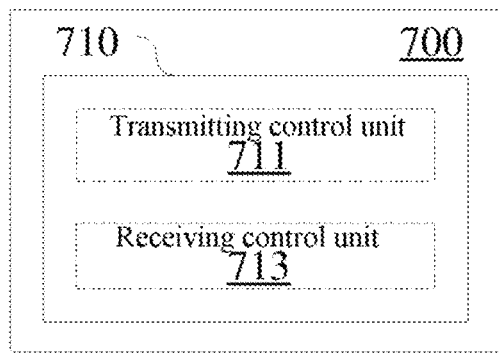
FIG. 7 is a block diagram showing a configuration example of a wireless network management device according to an embodiment of the present disclosure.

As shown in FIG. 7, a wireless network management device 700 according to an embodiment includes processing circuitry 710. The processing circuitry 710 includes a transmitting control unit 711 and a receiving control unit 713.

The transmitting control unit 711 is configured to perform control to transmit spectrum supply and demand information to a spectrum management node. The receiving control unit 713 is configured to perform control to receive information indicating a spectrum allocation manner from the spectrum management node. The spectrum allocation manner is determined based at least in part on the spectrum supply and demand information.

Figure 8:
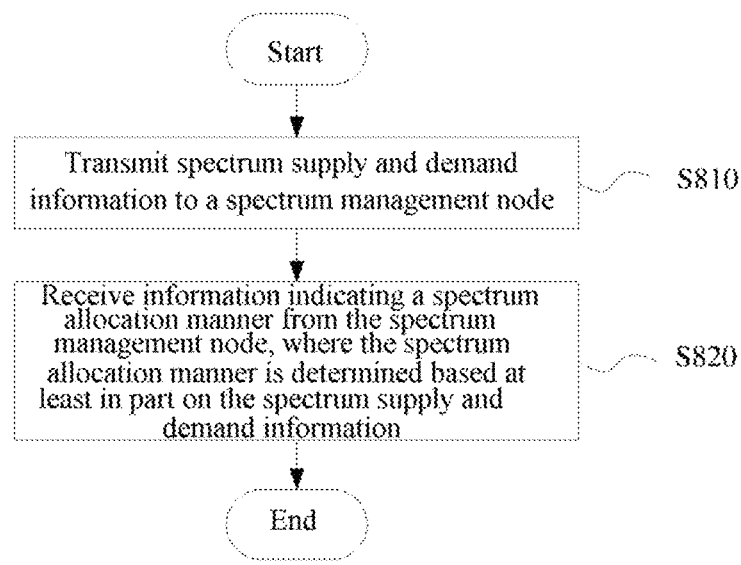
FIG. 8 is a flowchart showing a process example of a wireless network management method according to an embodiment of the present disclosure.

FIG. 8 shows a wireless network management method according to an embodiment. The wireless network management method includes step S810 and step S820.

In step S810, spectrum supply and demand information is transmitted to a spectrum management node.

In step S820, information indicating a spectrum allocation manner is received from the spectrum management node. The spectrum allocation manner is determined based at least in part on the spectrum supply and demand information.

In addition, a computer readable medium is further provided according to an embodiment of the present disclosure. The computer readable medium includes executable instructions that, when executed by an information processing apparatus, cause the information processing apparatus to execute the method according to the embodiments of the present disclosure.

As an example, various steps of the methods above and various modules and/or units of the devices above may be implemented as software, firmware, hardware or a combination thereof. In a case of implementing by software or firmware, programs constituting the software for implementing the methods above are installed to a computer with a dedicated hardware structure (for example, a general-purpose computer 2300 shown in FIG. 23) from the storage medium or the network. The computer can perform various functions when installed with various programs.

Figure 23:
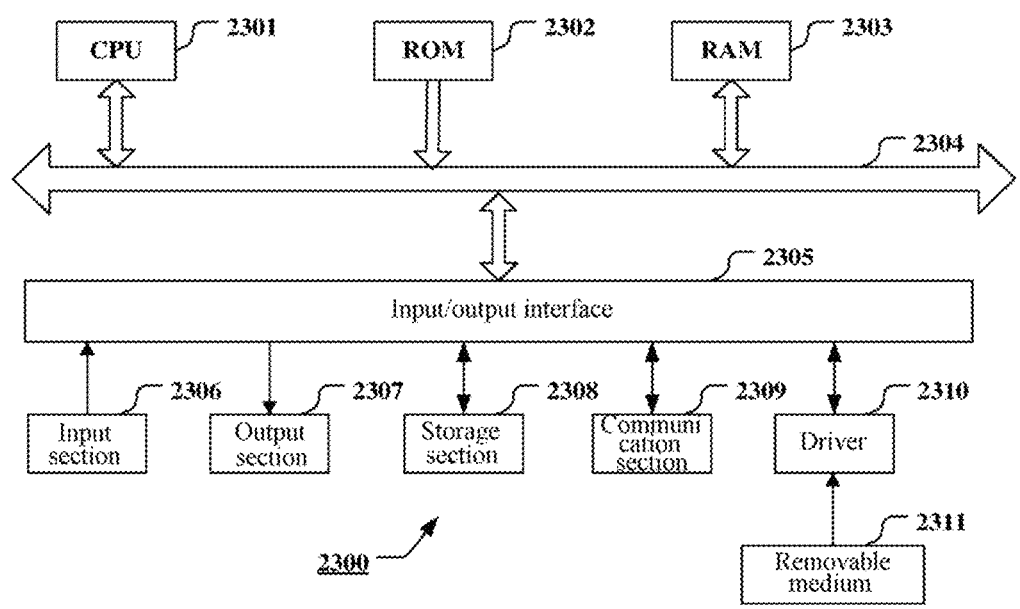
FIG. 23 is a block diagram showing an exemplary structure of a computer for implementing the method and apparatus according to the present disclosure.

In FIG. 23, a central processing unit (CPU) 2301 performs various processing according to programs stored in a read only memory (ROM) 2302 or programs loaded from a storage section 2308 to a random access memory (RAM) 2303. Data required when the CPU 2301 performs various processing is also stored in the RAM 2303 as needed. The CPU 2301, the ROM 2302 and the RAM 2303 are linked to each other via a bus 2304. An input/output interface 2305 is also linked to the bus 2304.

The following components are linked to the input/output interface 2305: an input section 2306 (including a keyboard, and a mouse and so on), an output section 2307 (including a display, for example a cathode ray tube (CRT) and a liquid crystal display (LCD), and a loudspeaker), a storage section 2308 (including a hard disk and so on), and a communication section 2309 (including a network interface card for example a LAN card, and a modem). The communication section 2309 performs communication processing via a network for example the Internet. A driver 2310 may also be linked to the input/output interface 2305 as needed. A removable medium 2311 for example a magnetic disk, an optical disk, a magnetic-optical disk and a semiconductor memory may be installed on the driver 2310 as needed, such that computer programs read from the removable medium 2311 are installed on the storage section 2308 as needed.

In a case of performing the series of processing described above by software, programs constituting the software are installed from the network for example the Internet or the storage medium, for example, the removable medium 2311.

Those skilled in the art should understand that the storage medium is not limited to the removable medium 2311 shown in FIG. 23 which stores programs and is distributed separately from the device to provide the programs to the user. Examples of the removable medium 2311 include: a magnetic disk (including a floppy disk (registered trademark)), an optical disk (including a compact disk read only memory (CD-ROM) and a digital versatile disk (DVD)), a magneto-optical disk (including a mini disk (MD) (registered trademark)), and a semiconductor memory. Alternatively, the storage medium may be a hard disk included in the ROM 2302 and the storage section 2308 which stores programs, which may be distributed to the user together with the device including the same.

A program product storing machine readable instruction codes is further provided according to an embodiment of the present disclosure. When read and executed by a machine, the instruction codes cause the machine to perform the method according to the embodiment of the present disclosure.

Accordingly, a storage medium for carrying the program product storing the machine readable instruction codes is further provided according to the present disclosure.

The storage medium includes but not limited to a floppy disk, an optical disk, a magnetic-optical disk, a storage card and a memory stick and so on.

The embodiments of the present disclosure further relate to an electronic device in the following. In a case that the electronic device is used for a base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communications (which is also referred to as a base station device); and one or more remote radio heads (RRH) located at positions different from the body. In addition, various types of terminals described in the following each may operate as a base station by performing functions of the base station temporarily or in a semi-permanent manner.

In a case that the electronic device is used for a user equipment side, the electronic device may be implemented as a mobile terminal (such as a smart phone, a tablet personal computer (PC), a notebook PC, a portable game terminal, a portable/dongle mobile router and a digital camera) or an in-vehicle terminal (such as a car navigation device). In addition, the electronic device may be a wireless communication module installed on each of the above terminals (such as an integrated circuit module including one or more chips).

Application Example of a Terminal Device

Figure 24:
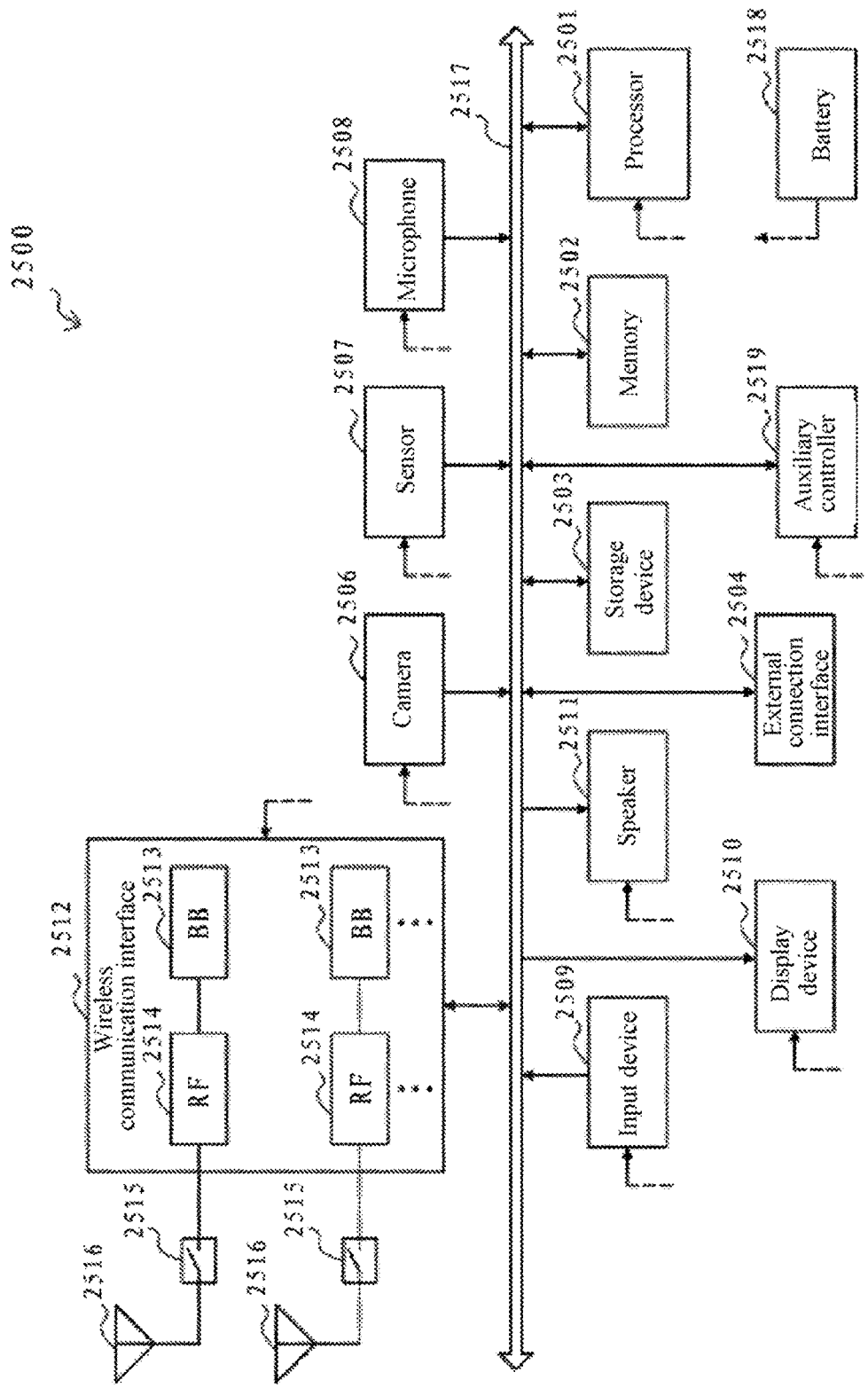
FIG. 24 is a block diagram showing an example of a schematic configuration of a smart phone to which the technology according to the present disclosure may be applied.

FIG. 24 is a block diagram showing an example of a schematic configuration of a smart phone 2500 to which the technology according to the present disclosure may be applied. The smart phone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage device 2503 may include a storage medium such as a semiconductor memory and a hard disk. The external connection interface 2504 is an interface for connecting an external device (such as a memory card and a universal serial bus (USB) device) to the smart phone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 into audio signals. The input device 2509 includes, for example, a touch sensor configured to detect touch onto a screen of the display device 2510, a keypad, a keyboard, a button, or a switch, and receives an operation or information inputted by a user. The display device 2510 includes a screen (such as a liquid crystal display (LCD) and an organic light-emitting diode (OLED) display), and displays an output image of the smart phone 2500. The speaker 2511 converts audio signals that are outputted from the smart phone 2500 into sounds.

The wireless communication interface 2512 supports any cellular communication scheme (such as LTE and LTE-Advanced), and performs wireless communication. The wireless communication interface 2512 may generally include, for example, a baseband (BB) processor 2513 and a radio frequency (RF) circuit 2514. The BB processor 2513 may perform, for example, encoding/decoding, modulating/demodulating, and multiplexing/demultiplexing, and performs various types of signal processing for wireless communication. In addition, the RF circuit 2514 may include, for example, a frequency mixer, a filter, and an amplifier, and transmits and receives wireless signals via the antenna 2516. The wireless communication interface 2512 may be a chip module having the BB processor 2513 and the RF circuit 2514 integrated thereon. The wireless communication interface 2512 may include multiple BB processors 2513 and multiple RF circuits 2514, as shown in FIG. 24. Although FIG. 24 shows the example in which the wireless communication interface 2512 includes the multiple BB processors 2513 and the multiple RF circuits 2514, the wireless communication interface 2512 may include a single BB processor 2513 or a single RF circuit 2514.

Furthermore, in addition to a cellular communication scheme, the wireless communication interface 2512 may support another type of wireless communication scheme such as a short-distance wireless communication scheme, a near field communication scheme, and a radio local area network (LAN) scheme. In this case, the wireless communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used by the wireless communication interface 2512 to transmit and receive wireless signals. The smart phone 2500 may include multiple antennas 2516, as shown in FIG. 24. Although FIG. 24 shows the example in which the smart phone 2500 includes multiple antennas 2516, the smart phone 2500 may include a single antenna 2516.

Furthermore, the smart phone 2500 may include the antenna 2516 for each wireless communication scheme. In this case, the antenna switches 2515 may be omitted from the configuration of the smart phone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512, and the auxiliary controller 2519 to each other. The battery 2518 supplies power to various components of the smart phone 2500 shown in FIG. 24 via feeder lines, which are partially shown as dashed lines in FIG. 24. The auxiliary controller 2519 operates a minimum necessary function of the smart phone 2500, for example, in a sleep mode.

In the smart phone 2500 shown in FIG. 24, the transceiving device of the apparatus at the UE side may be implemented by the wireless communication interface 2512. At least a part of functions of the processing circuitry and/or various units of the electronic device or the information processing device at the UE side may be implemented by the processor 2501 or the auxiliary controller 2519. For example, power consumption of the battery 2518 may be reduced by performing a part of the functions of the processor 2501 by the auxiliary controller 2519. In addition, the processor 2501 or the auxiliary controller 2519 may perform at least a part of the functions of the processing circuitry and/or various units of the electronic device or the information processing device at the UE side by executing programs stored in the memory 2502 or the storage device 2503.

Application Example of a Base Station

Figure 25:
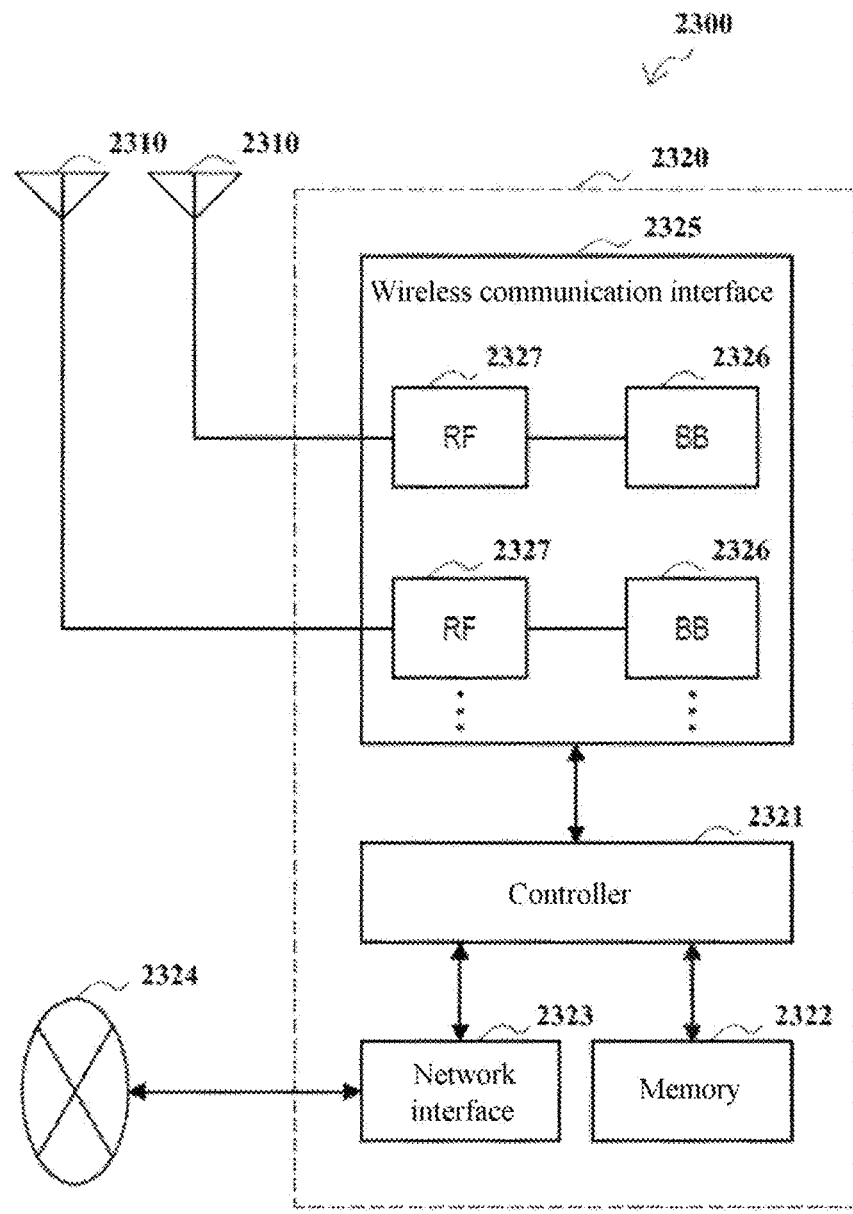
FIG. 25 is a block diagram showing an example of a schematic configuration of a gNB (a base station in a 5G system) to which the technology according to the present disclosure may be applied.

FIG. 25 is a block diagram showing an example of a schematic configuration of a gNB to which the technology according to the present disclosure may be applied. A gNB 2300 includes multiple antennas 2310 and a base station device 2320. The base station device 2320 and each antenna 2310 may be connected to each other via a radio frequency (RF) cable.

Each of the antennas 2310 includes a single or multiple antenna elements (such as multiple antenna elements included in a multiple input multiple output (MIMO) antenna) and is used by the base station device 2320 to transmit and receive wireless signals. As shown in FIG. 25, the gNB 2300 may include multiple antennas 2310. For example, the multiple antennas 2310 may be compatible with multiple frequency bands used by the gNB 2300.

The base station device 2320 includes a controller 2321, a memory 2322, a network interface 2323 and a wireless communication interface 2325.

The controller 2321 may be a CPU or a DSP and control various functions of higher layers of the base station device 2320. For example, the controller 2321 generates a data packet based on data in a signal processed by the wireless communication interface 2325, and transfers the generated packet via a network interface 2323. The controller 2321 may bind data from multiple baseband processors to generate a binding packet and transfer the generated binding packet. The controller 2321 may have logic functions for performing a control such as radio resource control, radio carrying control, mobility management, admission control and schedule. The control may be performed in combination with an adjacent gNB or a core network node. The memory 2322 includes RAM and ROM, and stores programs executed by the controller 2321 and various types of control data (such as a terminal list, transmission power data and scheduling data).

The network interface 2323 is a communication interface for connecting the base station device 2320 to the core network 2324. The controller 2321 may communicate with the core network node or another gNB via the network interface 2323. In this case, the gNB 2300 may be connected with the core network node or another gNB via a logic interface (such as an S1 interface and an X2 interface). The network interface 2323 may be a wired communication interface or a wireless communication interface for a radio backhaul line. If the network interface 2323 is a wireless communication interface, the network interface 2323 may use a higher frequency band for wireless communication than the frequency band used by the wireless communication interface 2325.

The wireless communication interface 2325 supports any cellular communication scheme (such as long term evolution (LTE) and LTE-advanced), and provides a wireless connection to a terminal located in a cell of the gNB 2300 via an antenna 2310. The wireless communication interface 2325 may generally include, for example, a BB processor 2326 and an RF circuit 2327. The BB processor 2326 may perform, for example, encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 2321, the BB processor 2326 may perform a part or all of the above logic functions. The BB processor 2326 may be a memory storing communication control programs or a module including a processor configured to execute programs and a related circuit. Updating programs may change functions of the BB processor 2326. The module may be a card or a blade inserted into a slot of the base station device 2320. Alternatively, the module may be a chip installed on the card or the blade. The RF circuit 2327 may include, for example, a frequency mixer, a filter and an amplifier, and transmits and receives wireless signals via the antenna 2310.

As shown in FIG. 25, the wireless communication interface 2325 may include multiple BB processors 2326. For example, the multiple BB processors 2326 may be compatible with multiple frequency bands used by the gNB 2300. As shown in FIG. 25, the wireless communication interface 2325 may include multiple RF circuits 2327. For example, the multiple RF circuits 2327 may be compatible with multiple antenna elements. Although FIG. 25 shows an example in which the wireless communication interface 2325 includes multiple BB processors 2326 and multiple RF circuits 2327, the wireless communication interface 2325 may include a single BB processor 2326 or a single RF circuit 2327.

In the gNB 2300 shown in FIG. 25, the transceiving device of the wireless communication device at the base station side may be implemented by the wireless communication interface 2325. At least a part of the functions of the processing circuitry and/or various units of the electronic device or the wireless communication device at the base station side may be implemented by the controller 2321. For example, the controller 2321 may perform at least a part of the functions of the processing circuitry and/or various units of the electronic device or the wireless communication device at the base station side by performing the programs stored in the memory 2322.

In the description of specific embodiments of the present disclosure above, features described and/or illustrated for one embodiment may be used in one or more other embodiments in the same or similar manner, combined with features in other embodiments, or substitute for features in other embodiments.

It is be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limitation in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only exemplary and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. An electronic device for spectrum management, comprising:
    a transceiver;
    a memory; and
    processing circuitry configured to:
    perform control to operate as a first spectrum management node that performs distributed spectrum management with a second spectrum management node,
    wherein the distributed spectrum management comprises:
    exchanging initial spectrum supply-and-demand information with the second spectrum management node,
    wherein the initial spectrum supply-and-demand information is related to a spectrum supply-and-demand of at least one first wireless network management node managed by the first spectrum management node and at least one second wireless network managed by the second spectrum management node,
    wherein the initial spectrum supply-and-demand information is stored in the memory in a form of blockchain,
    wherein, in the exchanging of the initial spectrum supply-and-demand information, the electronic device is configured to take specific actions as follows:
    upon determining a case where a plurality pieces of new spectrum allocation information are received within a specific period of time, the processing circuitry is configured to select one of the plurality pieces of new spectrum allocation information having an earliest publication time therefrom to perform at least one of the spectrum assignments based on the selected one of the plurality pieces of new spectrum allocation information received within the specific period of time,
    upon determining a case where a plurality pieces of new spectrum allocation information having a same block serial number are received, the processing circuitry is configured to select one of the plurality pieces of new spectrum allocation information having an earliest publication time therefrom to perform at least one of the spectrum assignments based on the selected one of the plurality pieces of new spectrum allocation information having the same block serial number,
    upon determining a case where a time window identifier of received new spectrum allocation information is not continuous with a time window identifier of currently stored spectrum allocation information, the processing circuitry is configured to send a request for performing information synchronization to the second spectrum management node,
    upon determining a case where a block serial number of received new spectrum allocation information is not continuous with a serial number of a currently stored blockchain, the processing circuitry is configured to send a request for performing information synchronization to the first spectrum management node,
    upon determining a case where a predetermined number of pieces of spectrum allocation information are stored, the processing circuitry is configured to notify a spectrum allocation indicated by spectrum allocation information preceding the predetermined number of pieces of spectrum allocation information to each of the first wireless network management node and the second wireless network management node, or
    upon determining a case where a predetermined number of blocks are stored, the processing circuitry is configured to notify a spectrum allocation indicated by a block preceding the predetermined number of blocks to each of the first wireless network management node and the second wireless network management node.

2. The electronic device according to claim 1, wherein the spectrum supply-and-demand of the at least one first wireless network management node comprises at least one of first spectrum remising information or first spectrum demand information.

3. The electronic device according to claim 1, wherein the spectrum supply-and-demand information of the second wireless network management node comprises at least one of second spectrum remising information or second spectrum demand information.

4. The electronic device according to claim 1, wherein the distributed spectrum management further comprises:
    based on the exchanged initial spectrum supply-and-demand information, exchanging final spectrum supply-and-demand information with the second spectrum management node, the final spectrum supply-and-demand information including a spectrum assignment of the at least one first wireless network management node and a spectrum assignment of the at least one second wireless network management node.

5. The electronic device according to claim 4, wherein the spectrum assignments of the at least one first wireless network management node and the at least one second wireless network management node are set to ensure that:
    the spectrum assignments of the at least one first wireless network management node and the at least one second wireless network management node are both within a predetermined spectrum usage range;
    mutual interference between the spectrum assignments of the at least one first wireless network management node and the at least one second wireless network management node are within a first predetermined interference range and a second predetermined interference range, respectively; and
    the spectrum assignments of the at least one first wireless network management node and the at least one second wireless network management node satisfy a total spectrum supply-and-demand of the first wireless network management node and a total spectrum supply-and-demand of the second wireless network management node.

6. The electronic device according to claim 4, wherein the final spectrum supply-and-demand information is stored in the memory in a form of blockchain.

7. The electronic device according to claim 1, wherein the electronic device is configured at a Spectrum Access System (SAS) side or a Co-existence Manager (CxM) side, and the second wireless network management node comprises a Citizens Broadband Radio Service Device (CBSD).

8. The electronic device according to claim 1, wherein the electronic device is configured at a C3 instance side, and the second wireless network management node comprises a Wireless Access System (WAS) or a Radio Local Area Network (RLAN).

9. A method for performing distributed spectrum management by an electronic device comprising processing circuitry and a memory, the electronic device configured to operate as a first spectrum management node, the method comprising:

performing distributed spectrum management with a second spectrum management node, wherein the distributed spectrum management comprises:

exchanging initial spectrum supply-and-demand information with the second spectrum management node, wherein the initial spectrum supply-and-demand information is related to a spectrum supply-and-demand of at least one first wireless network management node managed by the first spectrum management node and at least one second wireless network managed by the second spectrum management node, wherein the method further comprises storing the initial spectrum supply-and demand information in the memory in a form of blockchain, wherein the exchanging of the initial spectrum supply-and-demand information further comprises taking specific actions as follows:

upon determining a case where a plurality pieces of new spectrum allocation information are received within a specific period of time, selecting one of the plurality pieces of new spectrum allocation information having an earliest publication time therefrom to perform at least one of the spectrum assignments based on the selected one of the plurality pieces of new spectrum allocation information received within the specific period of time of the selected one of the plurality pieces of new spectrum allocation information having the same block serial number, upon determining a case where a plurality pieces of new spectrum allocation information having a same block serial number are received, selecting one of the plurality pieces of new spectrum allocation information having an earliest publication time therefrom to perform at least one of the spectrum assignments based on the selected one of the plurality pieces of new spectrum allocation information having the same block serial number, upon determining a case where a time window identifier of received new spectrum allocation information is not continuous with a time window identifier of currently stored spectrum allocation information, sending a request for performing information synchronization to the second spectrum management node, upon determining a case where a block serial number of received new spectrum allocation information is not continuous with a serial number of a currently stored blockchain, sending a request for performing information synchronization to the first spectrum management node, upon determining a case where a predetermined number of pieces of spectrum allocation information are stored, notifying a spectrum allocation indicated by spectrum allocation information preceding the predetermined number of pieces of spectrum allocation information to each of the first wireless network management node and the second wireless network management node, or upon determining a case where a predetermined number of blocks are stored, notifying a spectrum allocation indicated by a block preceding the predetermined number of blocks to each of the first wireless network management node and the second wireless network management node.

* * * * *